US011704620B2

(12) United States Patent
Mohamed et al.

(10) Patent No.: US 11,704,620 B2
(45) Date of Patent: Jul. 18, 2023

(54) ESTIMATING SYSTEM, ESTIMATING METHOD, AND INFORMATION STORAGE MEDIUM

(71) Applicant: Rakuten Group, Inc., Tokyo (JP)

(72) Inventors: Mohamed Reda Elsayed Mohamed, Tokyo (JP); Jeremiah Luke Anderson, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 194 days.

(21) Appl. No.: 16/892,360

(22) Filed: Jun. 4, 2020

(65) Prior Publication Data

US 2020/0387860 A1 Dec. 10, 2020

(30) Foreign Application Priority Data

Jun. 6, 2019 (JP) .................................. 2019-105989

(51) Int. Cl.
*G06Q 10/0833* (2023.01)
*G01C 21/34* (2006.01)
(Continued)

(52) U.S. Cl.
CPC ....... *G06Q 10/0833* (2013.01); *G01C 21/343* (2013.01); *G01C 21/3691* (2013.01);
(Continued)

(58) Field of Classification Search
CPC combination set(s) only.
See application file for complete search history.

(56) References Cited

U.S. PATENT DOCUMENTS

2007/0288155 A1* 12/2007 Kaneda ................ G06Q 10/025
701/465
2012/0100869 A1* 4/2012 Liang ..................... H04W 4/02
455/456.1
(Continued)

FOREIGN PATENT DOCUMENTS

JP 2008-030951 A 2/2008
JP 2010073072 A 4/2010
(Continued)

OTHER PUBLICATIONS

Matsushita et al., Delivery Management System, Apr. 30, 2020, Japan Patent Office, JP 2020067677 A (Machine Translation) (Year: 2020).*

(Continued)

*Primary Examiner* — Crystol Stewart
(74) *Attorney, Agent, or Firm* — Sughrue Mion, PLLC

(57) ABSTRACT

Provided is an estimating system including: at least one memory configured to store computer program code; and at least one processor configured to access said at least one memory and operate according to said computer program code, said computer program code including: via point acquisition code configured to cause the at least one processor to acquire a position of a via point, wherein the route is a path followed by a mobile object when the mobile object moves toward a destination; staying time period code configured to cause the at least one processor to estimate, based on the position of the via point, a staying time period; and arrival time code configured to cause the at least one processor to estimate, by including the staying time period, an arrival time of the mobile object at the destination.

14 Claims, 12 Drawing Sheets

(51) Int. Cl.
  *G01C 21/36* (2006.01)
  *G06Q 10/0631* (2023.01)
  *G06N 20/00* (2019.01)
  *G06F 16/29* (2019.01)
  *G06Q 10/083* (2023.01)
  *H04W 4/029* (2018.01)
  *G08B 21/18* (2006.01)
  *G08G 1/00* (2006.01)

(52) U.S. Cl.
  CPC ............. *G06F 16/29* (2019.01); *G06N 20/00* (2019.01); *G06Q 10/063114* (2013.01); *G06Q 10/0838* (2013.01); *G08B 21/18* (2013.01); *G08G 1/205* (2013.01); *H04W 4/029* (2018.02)

(56) References Cited

U.S. PATENT DOCUMENTS

| | | | | |
|---|---|---|---|---|
| 2014/0195467 | A1* | 7/2014 | Yoshizu | G06N 20/00 706/46 |
| 2014/0278070 | A1* | 9/2014 | McGavran | G01C 21/3492 701/538 |
| 2016/0307446 | A1* | 10/2016 | Edakunni | G01C 21/3691 |
| 2017/0089720 | A1* | 3/2017 | Zhang | G06Q 10/02 |
| 2017/0236091 | A1* | 8/2017 | Putcha | G06Q 10/0833 705/333 |
| 2018/0080776 | A1* | 3/2018 | Nimchuk | G01C 21/3415 |
| 2018/0114375 | A1* | 4/2018 | Lucas | G06Q 10/1091 |
| 2018/0224288 | A1* | 8/2018 | Fujita | G01C 21/343 |
| 2019/0086223 | A1* | 3/2019 | Tanaka | G08G 1/096872 |
| 2019/0156672 | A1* | 5/2019 | Konishi | G06Q 10/025 |
| 2019/0332935 | A1* | 10/2019 | Sanchez Bermudez | G06N 3/0454 |
| 2019/0333130 | A1* | 10/2019 | Jha | G06Q 30/08 |
| 2020/0334637 | A1* | 10/2020 | Turner | G06Q 10/08355 |
| 2021/0285777 | A1* | 9/2021 | Ostadzadeh | G01C 21/3617 |
| 2022/0036257 | A1* | 2/2022 | Medina | G06Q 50/30 |

FOREIGN PATENT DOCUMENTS

| | | |
|---|---|---|
| JP | 2010155717 A | 7/2010 |
| JP | 2016157169 A | 9/2016 |
| JP | 2017151846 A | 8/2017 |
| JP | 2019040387 A | 3/2019 |

OTHER PUBLICATIONS

M. B. A, H. B, K. S, M. J. Shariff and P. M. G, "Demand forecasting and Route Optimization in Supply chain industry using Data Analytics," 2021 Asian Conference on Innovation in Technology (ASIANCON), Pune, India, 2021, pp. 1-7, doi: 10.1109/ASIANCON51346.2021.9544942. (Year: 2021).*

Dara Communication dated Oct. 6, 2020, from the Japanese Patent Office in application No. 2019-105989.

* cited by examiner

| PACKAGE ID | DELIVERY PERSON ID | DELIVERY ORDER | DESIRED DELIVERY DATE AND TIME | POSITION OF DELIVERY DESTINATION |
|---|---|---|---|---|
| p00001 | s00001 | 1 | 2019/6/3 14:00-16:00 | ..., MINATO CITY, TOKYO(X1,Y1) |
| p00002 | s00001 | 2 | 2019/6/3 14:00-16:00 | ..., MINATO CITY, TOKYO(X2,Y2) |
| p00003 | s00001 | 3 | 2019/6/3 14:00-16:00 | ..., MINATO CITY, TOKYO(X3,Y3) |
| ... | ... | ... | ... | ... |

| ARRIVAL TIME | STAYING TIME PERIOD | STATUS | NAME OF RECEIVING PERSON | ELECTRONIC MAIL ADDRESS OF RECEIVING PERSON |
|---|---|---|---|---|
| 2019/6/3 14:07 | 3MINUTES | DELIVERY COMPLETE | TARO YAMADA | aaa@aaa.com |
| 2019/6/3 14:15 | 10MINUTES | NOW DELIVERING | HANAKO TANAKA | bbb@bbb.com |
| 2019/6/3 14:35 | 5MINUTES | NOW DELIVERING | JIRO OKADA | ccc@ccc.com |
| ... | ... | ... | ... | ... |

FIG.7

| DELIVERY PERSON ID | POSITION DATA DB2 | |
|---|---|---|
| | POSITION | TIME |
| s00001 | (Xa1,Ya1) | 2019/05/25 10:00:00 |
| s00001 | (Xa2,Ya2) | 2019/05/25 10:00:10 |
| s00001 | (Xa3,Ya3) | 2019/05/25 10:00:20 |
| . . . | . . . | . . . |

| STAYING PLACE | STAYING TIME PERIOD |
|---|---|
| (X1,Y1) | 3MINUTES |
| (X2,Y2) | 10MINUTES |
| (X3,Y3) | 5MINUTES |
| ⋮ | ⋮ |

FIG.9

| FEATURE INFORMATION | STAYING TIME PERIOD |
|---|---|
| URBAN, APARTMENT BUILDING, 10 FLOORS, 50 ROOMS, HAS ELEVATOR, ··· | 10MINUTES |
| RURAL, STAND-ALONE HOUSE, 3 FLOORS, NO ELEVATOR, ··· | 3MINUTES |
| URBAN, APARTMENT BUILDING, 30 FLOORS, 250 ROOMS, HAS ELEVATOR, ··· | 25MINUTES |
| ⋮ | ⋮ |

DT1

ESTIMATING SYSTEM, ESTIMATING METHOD, AND INFORMATION STORAGE MEDIUM

CROSS-REFERENCE TO RELATED APPLICATION

The present application claims priority from Japanese application JP2019-105989 filed on Jun. 6, 2019, the content of which is hereby incorporated by reference into this application.

BACKGROUND OF THE INVENTION

1. Field of the Invention

The present invention relates to an estimating system, an estimating method, and an information storage medium.

2. Description of the Related Art

There has been investigated a technology for estimating an arrival time at which a mobile object, such as a delivery person or a delivery vehicle, is to arrive at a destination. For example, in Japanese Patent Application Laid-open No. 2008-030951, there is described a system configured to estimate, when a delivery person is to deliver a package to each of a plurality of delivery destinations in order, an arrival time at each delivery destination based on a travel time database in which travel times between the delivery destinations are registered. In the system of Japanese Patent Application Laid-open No. 2008-030951, when the delivery person has performed a delivery task at each delivery destination, the delivery person performs a predetermined operation on his or her own terminal. When the operation by the delivery person is detected, an arrival time at a delivery destination to which the delivery person is to move next is recalculated and updated as the latest arrival time.

SUMMARY OF THE INVENTION

However, in the technology of Japanese Patent Application Laid-open No. 2008-030951, the arrival time at each delivery destination is estimated based on movement time periods between delivery destinations registered in the travel time database, but in actual practice, in addition to the movement between the delivery destinations, there is also a staying time period at each delivery destination. The length of the staying time period varies depending on the delivery destination. For example, delivery takes longer for a large apartment building than for a stand-alone house, and delivery takes longer for an apartment building without an elevator than for an apartment building with an elevator installed.

In regard to this point, Japanese Patent Application Laid-open No. 2008-030951 is a technology for detecting an actual delivery status of a package by the delivery person and recalculating the arrival time. However, the arrival time is not recalculated unless the delivery person operates the terminal at each delivery destination. For this reason, in the technology of Japanese Patent Application Laid-open No. 2008-030951, only the staying time period that has actually passed until the delivery person operates the terminal is reflected in the arrival time, and hence the estimation accuracy of the arrival time cannot be sufficiently increased.

The present invention has been made in view of the problem described above. It is an object of the present invention to provide an estimating system, an estimating method, and an information storage medium, which are capable of increasing the estimation accuracy of an arrival time.

In order to solve the above-mentioned problem, according to at least one embodiment of the present invention, there is provided an estimating system including at least one memory configured to store computer program code; and at least one processor configured to access said at least one memory and operate according to said computer program code, said computer program code including: via point acquisition code configured to cause the at least one processor to acquire a position of a via point, wherein the via point is on a route to a destination, wherein the route is a path followed by a mobile object when the mobile object moves toward the destination; staying time period code configured to cause the at least one processor to estimate, based on the position of the via point, a staying time period, wherein the staying time period represents an estimate of a time that the mobile object will stay at the position of the via point, wherein the estimate of the staying time period is based on a history of a delivery terminal that has stayed at the via point; and arrival time code configured to cause the at least one processor to estimate, by including the staying time period, an arrival time of the mobile object at the destination.

According to at least one embodiment of the present invention, there is provided an estimating method including: acquiring a position of a via point, wherein the via point is on a route to a destination, wherein the route is a path followed by a mobile object when the mobile object moves toward the destination; estimating, based on the position of the via point, a staying time period, wherein the staying time period represents an estimate of a time that the mobile object will stay at the position of the via point, wherein the estimate of the staying time period is based on a history of a delivery terminal that has stayed at the via point; and estimating, by including the staying time period, an arrival time of the mobile object at the destination.

According to at least one embodiment of the present invention, there is provided a non-transitory information storage medium having stored thereon a program for causing a computer to: acquire a position of a via point, wherein the via point is on a route to a destination, wherein the route is a path followed by a mobile object when the mobile object moves toward the destination; estimate, based on the position of the via point, a staying time period, wherein the staying time period represents an estimate of a time that the mobile object will stay at the position of the via point, wherein the estimate of the staying time period is based on a history of a delivery terminal that has stayed at the via point; and estimate, by including the staying time period, an arrival time of the mobile object at the destination.

In one aspect of the present invention, the program code further includes: current position acquisition code configured to cause the at least one processor to acquire a current position of the mobile object; destination acquisition code configured to cause the at least one processor to acquire a position of the destination; and movement time period code configured to cause the at least one processor to: estimate a movement time period based on the current position of the mobile object and on the position of the destination, and estimate the arrival time based on the movement time period and the staying time period.

In one aspect of the present invention, the staying time period code is further configured to cause the at least one processor to: refer to a database, wherein the database stores position data, wherein the position data includes at least one of: i) first position data indicating a first relationship between a position of the mobile object and time, and ii) second position data indicating a second relationship between a position of another mobile object and time; calculate, based on the position data, a plurality of staying time periods, wherein respective ones of the plurality of staying time periods corresponds to respective ones of a plurality of staying places; and estimate the staying time period at the via point based on: i) the plurality of staying time periods and ii) the position of the via point.

In one aspect of the present invention, the program code further includes calculation code configured to cause the at least one processor to: cluster the position data into a plurality of clusters, wherein each cluster corresponds to respective portions of the position data; and calculate, for each cluster of the plurality of clusters and based on the respective portions of the position data, the plurality of staying time periods, wherein respective ones of the plurality of staying time periods correspond to respective ones of the plurality of staying places.

In one aspect of the present invention, the program code further includes calculation code configured to cause the at least one processor to: identify a first staying place of the plurality of staying places by determining, based on the position data, whether one of the mobile object and the another mobile object has been within a certain range of the first staying place, wherein the certain range is associated with a movement speed less than a predetermined threshold; and calculate, for the first staying place, a first staying time period of the first staying place based on the position data.

In one aspect of the present invention, the program code further includes calculation code configured to cause the at least one processor to restrict use, in estimation of the staying time period, of a staying time period having a low probability of becoming one of a destination and a via point, wherein low probability corresponds to a corresponding destination or via point not corresponding to a past delivery destination.

In one aspect of the present invention, the staying time period code is further configured to cause the at least one processor to estimate the staying time period based on first feature information associated with the via point, wherein the first feature information is associated with the position of the via point.

In one aspect of the present invention, the computer program code includes learning code configured to cause the at least one processor to use a machine learning model, wherein the learning model describes a relationship between second feature information of a staying place, wherein at least one of the mobile object and the another mobile object have stayed at the staying place in the past for a staying time period, and wherein the staying time period code is further configured to input the feature information on the via point to the machine learning model, and to acquire the staying time period output from the machine learning model.

In one aspect of the present invention, the first feature information indicates an attribute of one of a region and a building, and wherein the staying time period code is further configured to estimate the staying time period based on the attribute.

In one aspect of the present invention, the first feature information indicates one of a time slot and a time of staying at the via point, and wherein the staying time period code is further configured to estimate the staying time period based on one of the time slot and the time of staying at the via point.

In one aspect of the present invention, the first feature information indicates a weather condition at the via point, and wherein the staying time period code is further configured to estimate the staying time period based on the weather condition at the via point.

In one aspect of the present invention, the staying time period code is further configured to estimate the staying time period based on the position of the via point and on an attribute of the mobile object.

In one aspect of the present invention, the program code further includes notification code configured to cause the at least one processor to notify a user, before the mobile object arrives at the destination and wherein the user is associated with the destination, of the arrival time.

In one aspect of the present invention, the mobile object includes one of a delivery person and a machine for delivering a package to each of a plurality of delivery destinations in order, wherein the plurality of delivery destinations includes the destination, wherein the plurality of delivery destinations includes the via point, and wherein the via point includes a first delivery destination earlier in a delivery order than a second delivery destination, wherein the second delivery destination corresponds to the destination.

BRIEF DESCRIPTION OF THE DRAWINGS

FIG. 6 is a table for showing a data storage example of a delivery database.

FIG. 7 is a table for showing a data storage example of a position database.

FIG. 8 is a table for showing a data storage example of a staying time period database.

FIG. 9 is a table for showing a data storage example of teacher data.

DETAILED DESCRIPTION OF THE INVENTION

1. Overall Configuration of Estimating System

Figure 1:
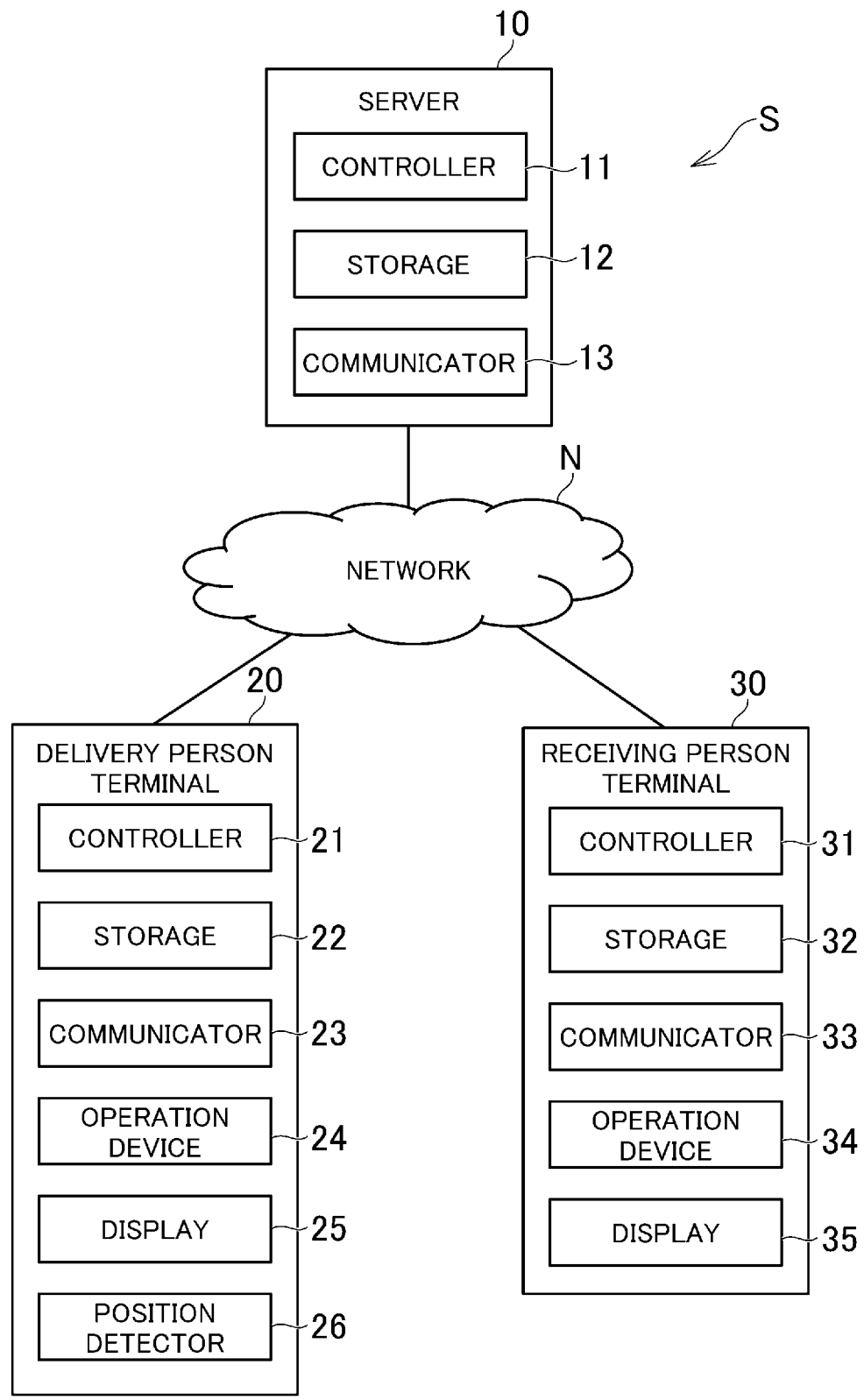
FIG. 1 is a diagram for illustrating an example of an overall configuration of an estimating system according to at least one embodiment of the present invention.

Now, an estimating system according to at least one exemplary embodiment of the present invention is described. In at least one embodiment, the configuration of the estimating system is described by giving as an example a case in which packages are delivered. FIG. 1 is a diagram for illustrating an example of the overall configuration of the estimating system. As illustrated in FIG. 1, an estimating system S includes a server 10, a delivery person terminal 20, and a receiving person terminal 30, each of which can be connected to a network N, for example, the Internet. In FIG. 1, there is illustrated one server 10, one delivery person terminal 20, and one receiving person terminal 30, but there may be a plurality of each of those.

The server 10 is a server computer. The server 10 includes a controller 11, a storage 12, and a communicator 13. The controller includes at least one microprocessor. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a ROM, an EEPROM, a flash memory, or a hard disk drive. The communicator 13 is a communication interface for wired communication or wireless communication, and performs data communication via the network N. The communicator 13 may include a wireless communicator (processor, memory, RF section, antenna, battery, baseband section, interface) and wired network communicator (LAN card).

The delivery person terminal 20 is a computer to be operated by the delivery person. For example, the delivery person terminal 20 is a cell phone (including smartphones), a portable information terminal (including tablet computers or wearable terminals), or a personal computer. The delivery person terminal 20 is portable and moves together with the delivery person. For example, the delivery person terminal 20 includes a controller 21, a storage 22, a communicator 23, an operation device 24, a display 25, and a position detector 26. The physical configuration of each of the controller 21, the storage 22, and the communicator 23 may be the same as those of the controller 11, the storage 12, and the communicator 13, respectively.

The operation device 24 is an input device, and is, for example, a pointing device such as a touch panel and a mouse, a keyboard, or a button. The operation device 24 transmits details of operation by the user to the controller 21. The display 25 is, for example, a liquid crystal display or an organic EL display. The display 25 displays an image in accordance with an instruction of the controller 21.

The position detector 26 is a device configured to detect a position (a location) on the earth. For example, the position detector 26 includes a receiver configured to receive signals from satellites. In at least one embodiment, a GPS sensor is described as the receiver, but a GNSS sensor other than GPS may be used. The method of detecting the position is not limited to a method using signals from satellites, and any method may be used. For example, the position detector 26 may detect the position by using details of communication to/from a wireless base station, a wireless access point, or the like, or may detect the position by using a detection signal obtained by an acceleration sensor, a gyro sensor, or the like. As another example, the position detector 26 may detect the position by using an image photographed by a camera.

The receiving person terminal 30 is a computer to be operated by a person who is to receive the package. For example, the receiving person terminal 30 is a cell phone (including smartphones), a portable information terminal (including tablet computers or wearable terminals), or a personal computer. For example, the receiving person terminal 30 includes a controller 31, a storage 32, a communicator 33, an operation device 34, and a display 35. The physical configuration of each of the controller 31, the storage 32, the communicator 33, the operation device 34, and the display 35 may be the same as those of the controller 11, the storage 12, the communicator 13, the operation device 24, and the display 25, respectively.

Programs and data to be described as being stored into the storages 12, 22, and 32 may be supplied thereto via the network N. Further, the respective hardware configurations of the computers described above are not limited to the above-mentioned examples, and various types of hardware can be applied thereto. For example, the hardware configuration may include a reader (e.g., an optical disc drive or a memory card slot) configured to read a computer-readable information storage medium, or an input/output device (e.g., a USB port) configured to input and output data to/from an external device. For example, the program and the data stored in the information storage medium may be supplied to each of the computers through intermediation of the reader or the input/output device.

2. Outline of Estimating System

In at least one embodiment, the delivery person loads a plurality of packages on a delivery vehicle, such as a car or a motorcycle, and delivers each package to each of the plurality of delivery destinations in order. The server 10 determines, based on a known route search method using the Dijkstra's method, the A-star method, or the like, the delivery route of the delivery person such that each delivery destination is visited in an order determined in advance. For example, the server 10 transmits the delivery route to the delivery person terminal 20, and the delivery person performs the delivery task while confirming the delivery route on the delivery person terminal 20.

Figure 2:
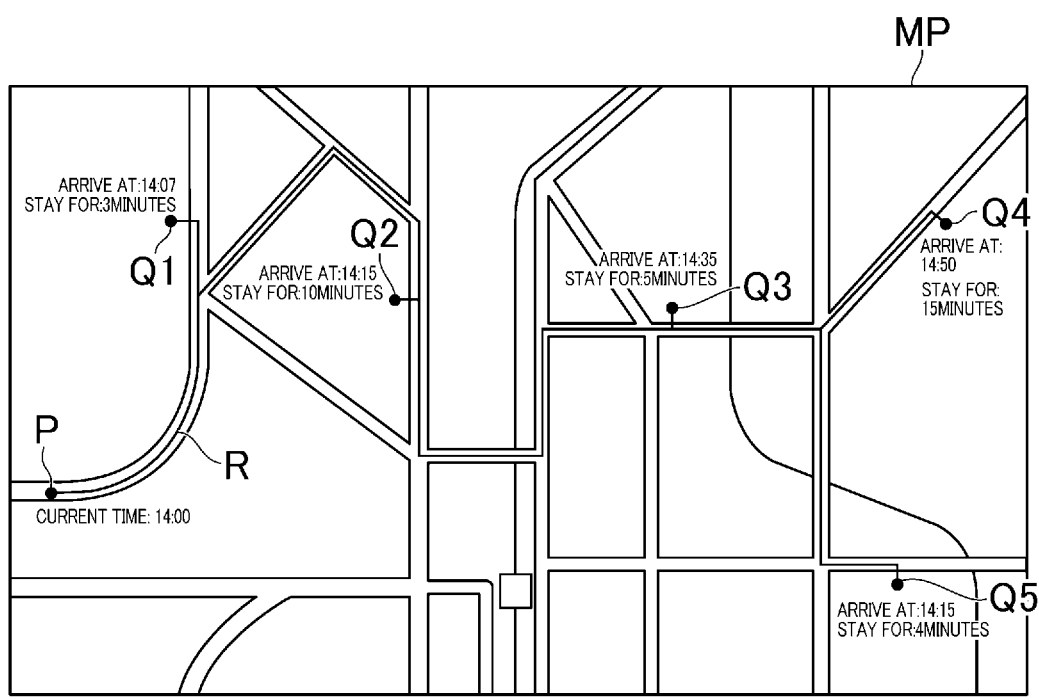
FIG. 2 is a map for showing an example of a delivery route displayed on a delivery person terminal.

FIG. 2 is a map for showing an example of the delivery route displayed on the delivery person terminal 20. As shown in FIG. 2, a map MP of a region in which the delivery person is in charge of deliveries is displayed on the delivery person terminal 20, and a delivery route R is shown on the map MP. The data of the map MP may be stored in advance in the delivery person terminal 20 or may be transmitted from the server 10 to the delivery person terminal 20.

In the example of FIG. 2, a current position P of the delivery person and delivery destinations Q1 to Q5 are displayed on the delivery route R. In this example, it is assumed that the delivery person delivers packages in the order of delivery destination Q1, Q2, Q3, Q4, and Q5. In the following description, the reference symbol for a delivery destination may be written as "Qn". The numerical value of n in Qn is a natural number indicating the order of delivery, and in the example of FIG. 2, is any integer of from 1 to 5.

For example, the current time is displayed near the current position P. For example, an arrival time for arriving at the delivery destination Qn and a staying time period for staying at the delivery destination Qn are shown near the delivery destination Qn. The arrival time and the staying time period are times estimated by the server 10. Details of the methods of estimating the arrival time and the staying time period are described later.

The term "time" as used in at least one embodiment may refer to only time, or may refer to date and time. The time may be indicated by hours, minutes and seconds, or may be indicated by only hours and minutes. The term "time" may also refer to a certain time point or may refer to a time slot having a certain length.

For example, the arrival time of the delivery destination Q1 is 14:07, which is obtained by adding 7 minutes, which is the movement time period from the current position P1 of the delivery person to the delivery destination Q1, to 14:00, which is the current time. There are no via points between the current position P1 and the delivery destination Q1, and hence it is estimated that the arrival time of the delivery destination Q1 does not involve a staying time period on the way. However, each of the arrival times for the delivery destinations Q2 to Q5 have a via point, and hence a staying time period on the way is taken into consideration.

In at least one embodiment, a staying time period is estimated for each staying place at which the delivery person has stayed in the past by statistically analyzing the positions of the delivery person during past deliveries. For example, the server 10 calculates the staying time period for each point by accumulating a history of the position data of the delivery person terminal 20 during past deliveries and analyzing the distribution of the position data. It is assumed that the position data includes not only the position but also the time. The details of the position data are described later.

Figure 3:
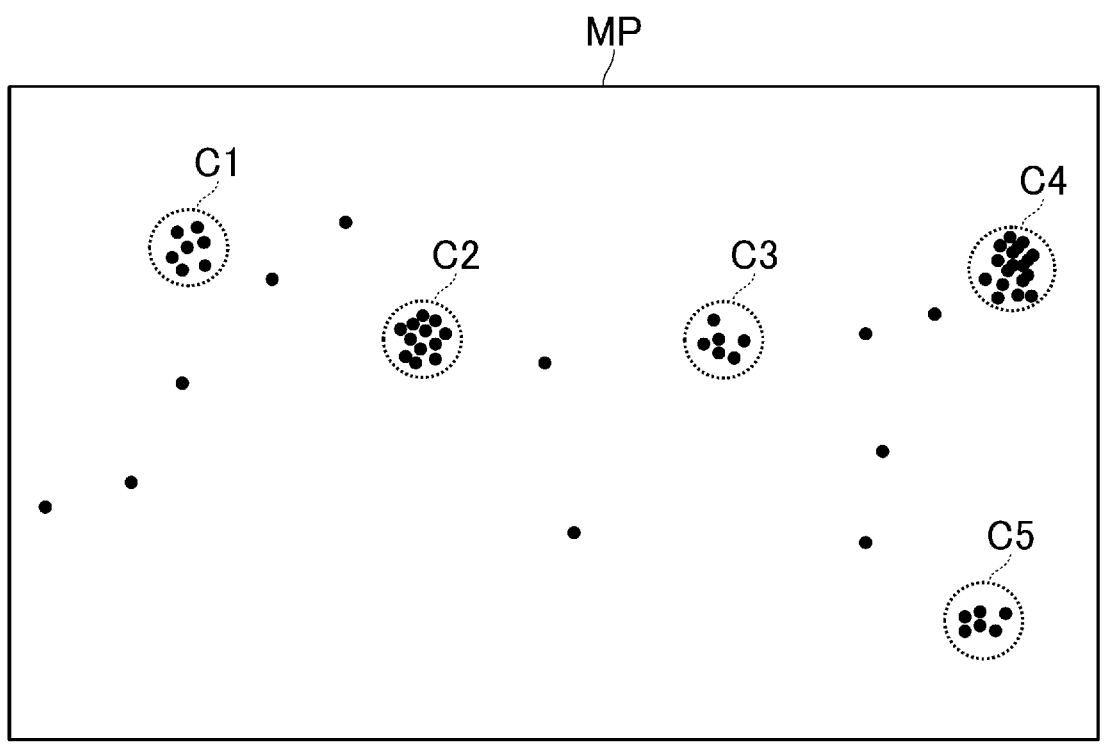
FIG. 3 is a diagram for illustrating position data plotted on the map.

FIG. 3 is a diagram for illustrating position data plotted on the map MP. In FIG. 3, the black circles indicate position data. In at least one embodiment, the delivery person terminal 20 periodically (e.g., every few seconds to one minute) uploads position data to the server 10, and hence the distribution of the position data for places through which the delivery person passes is sparse. However, for places at which the delivery person stays, the distribution of the position data is dense because the delivery person does not move much from those places.

For example, for a road through which a delivery person only passes, the distribution of the position data is sparse. However, for the delivery destinations to which the delivery person has delivered packages in the past, the distribution of the position data is dense because the delivery person remained at those points for a certain period of time. As the staying time period of the delivery person becomes longer, the density of the position data becomes higher. For example, in the case of an apartment building with a large number of households or an apartment building without an elevator, the delivery takes more time and the staying time period becomes longer, and hence the density of position data becomes higher.

In at least one embodiment, the server 10 performs clustering of position data, and calculates a staying time period for each cluster. In the map MP, the areas in which a cluster is detected indicate that a certain number of pieces of position data are densely accumulated, and therefore represent points at which the delivery person has stayed for a certain period of time.

In the example of FIG. 3, five clusters C1 to C5 are detected, and the clusters C1 to C5 indicate delivery destinations Q1 to Q5, respectively. For example, each of the delivery destinations Q1 to Q5 is a place to which the delivery person has delivered a package in the past, and the density of the position data is relatively high. Out of those delivery destinations, the delivery destinations Q2 and Q4 each corresponding to the clusters C2 and C4 have a higher position data density than those of the delivery destinations Q1, Q3, and Q5 corresponding to the other clusters C1, C3, and C5, and indicate a longer staying time period.

For example, the staying time period of the delivery destination Q1 is the difference between the latest time and the earliest time among the times indicated by the position data belonging to the cluster C1. In this example, the staying time period of the delivery destination Q1 is assumed to be 3 minutes. The staying time period is similarly calculated for the other delivery destinations Q2 to Q5, and the staying time periods of the delivery destinations Q2 to Q5 are 10 minutes, 5 minutes, 15 minutes, and 4 minutes, respectively.

In FIG. 3, although not shown in order to simplify the description, when the delivery person has delivered a package in the past to another point other than the delivery destinations Q1 to Q5 to which the delivery person is going to deliver from now, the another point is also detected as a cluster. However, the another point is not included in the present delivery route R, and hence the staying time period of the another point is not referred to when the arrival time is to be estimated. Further, in at least one embodiment, even when the delivery person has stayed at a place in the past, such as a gas station or a rest area, but the place is not a delivery destination, a staying time period of the cluster is not calculated for the place.

In at least one embodiment, the staying time period of each delivery destination Qn is displayed on the map M shown in FIG. 2. The arrival time of each delivery destination Qn is calculated by taking into consideration the staying time period of each of the previous delivery destinations Q1 to Qn−1. For example, the arrival time of the delivery destination Q2 is calculated to be 14:15 by adding 3 minutes, which is the staying time period of the delivery destination Q1, and 5 minutes, which is the movement time period from the delivery destination Q1 to the delivery destination Q2, to 14:07, which is the arrival time of delivery destination Q1.

The same applies to the subsequent delivery destinations Qk (k: integer of from 3 to 5). Specifically, the staying time period of the previous delivery destination Qk−1 and the movement time period from the delivery destination Qk−1 to the delivery destination Qk are added to the arrival time of the delivery destination Qk−1. In other words, the arrival time of the delivery destination Qk is a time obtained by taking into consideration the staying time periods of all the via points that the delivery person is to pass through until the delivery destination Qk and all the movement time periods until the delivery destination Qk. In at least one embodiment, when the arrival time estimated in the manner described above approaches, an electronic mail (email) indicating the arrival time is transmitted to the receiving person of each delivery destination Qn.

Figure 4:
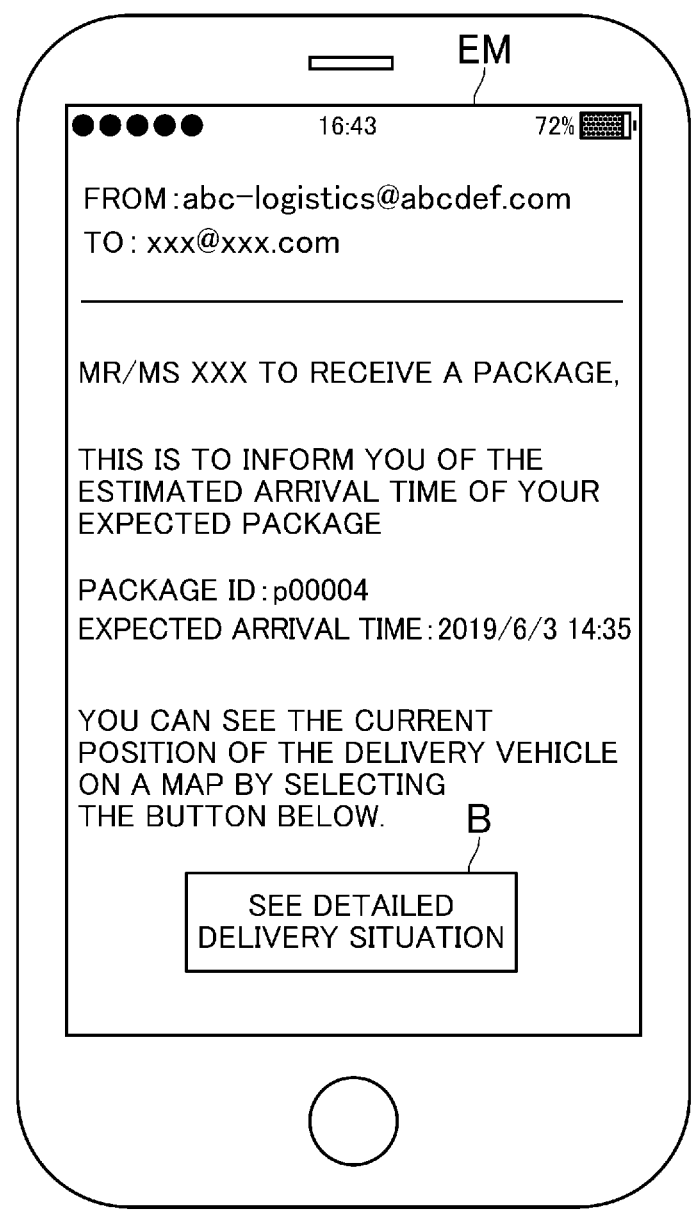
FIG. 4 is a diagram for illustrating how an electronic mail (email) showing an arrival time is displayed on a receiving person terminal.

FIG. 4 is a diagram for illustrating how an electronic mail showing the arrival time is displayed on the receiving person terminal 30. As illustrated in FIG. 4, the arrival time estimated for the delivery destination Qn at which the receiving person is present is displayed in an electronic mail EM. When the receiving person selects a button B, the receiving person terminal 30 may display the current position of the delivery person on a map.

In this way, the estimating system S is configured to increase the estimation accuracy of the arrival time by, when the delivery person moves toward a delivery destination Qn, estimating a staying time period corresponding to the position of each of the delivery destinations Q1 to Qn−1, which the delivery person is to pass through along the way, and then estimating the arrival time of the delivery destination Qn based on the staying time period of each of those delivery destinations Q1 to Qn−1. The details of the estimating system S are now described. In the following description, when it is not particularly required to refer to the drawings, the reference symbols of the delivery destinations and the like may be omitted.

3. Functions to be Implemented in Estimating System

Figure 5:
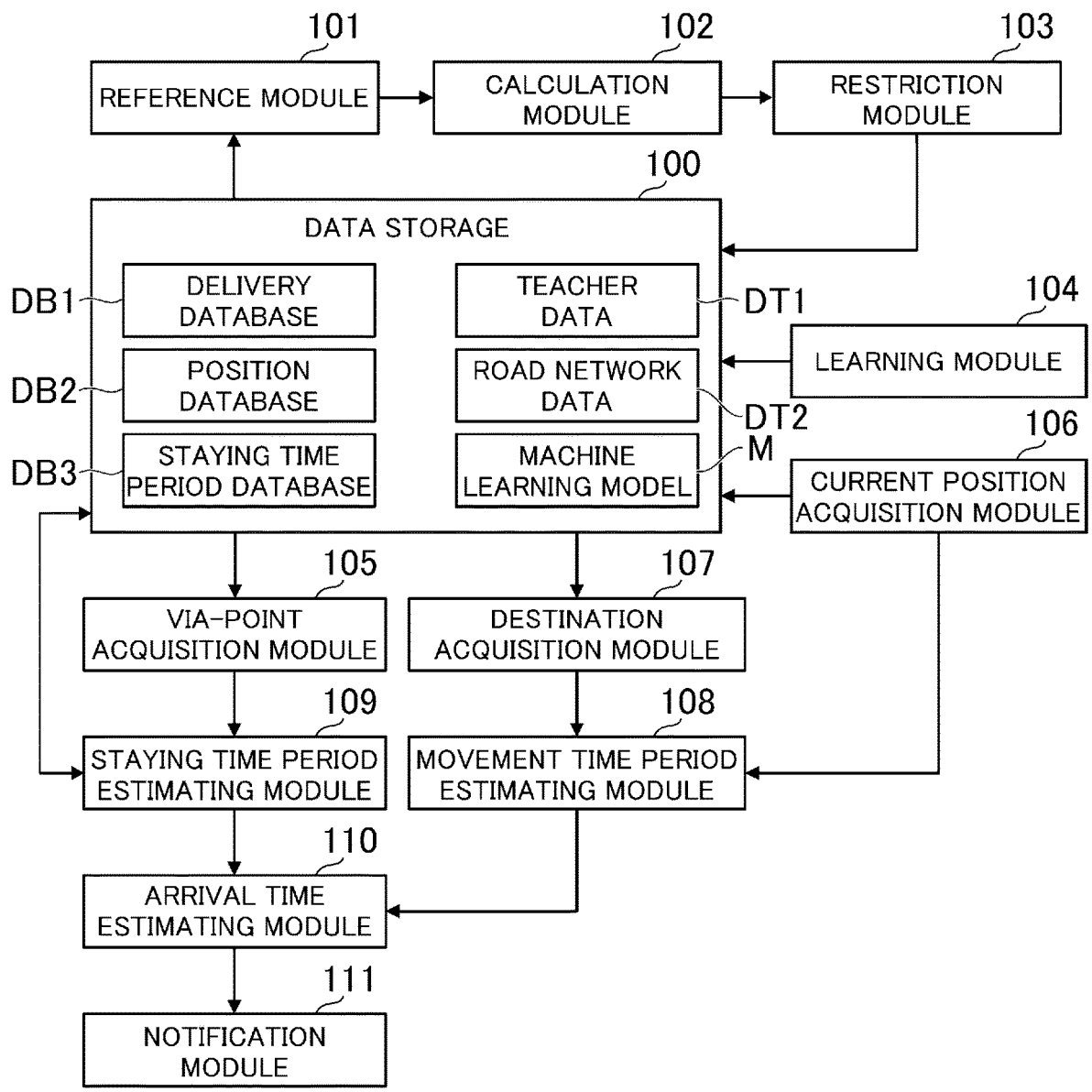
FIG. 5 is a functional block diagram for illustrating an example of functions to be implemented by the estimating system.

FIG. 5 is a functional block diagram for illustrating an example of functions to be implemented in the estimating system S. As illustrated in FIG. 5, in the estimating system S, a data storage 100, a reference module 101, a calculation module 102, a restriction module 103, a learning module 104, a via-point acquisition module 105, a current position acquisition module 106, a destination acquisition module 107, a movement time period estimating module 108, a staying time period estimating module 109, an arrival time estimating module 110, and a notification module 111 are implemented. In at least one embodiment, there is described a case in which each of those functions is implemented by the server 10.

[3-1. Data Storage]

The data storage 100 is implemented mainly by the storage 12. The data storage 100 is configured to store data required to execute the processing described in at least one embodiment. As examples of the data stored in the data storage 100, there are described a delivery database DB1, a position database DB2, a staying time period database DB3, teacher data DT1, road network data DT2, and a machine learning model M.

FIG. 6 is a table for showing a data storage example of the delivery database DB1. As shown in FIG. 6, the delivery database DB1 is a database in which information on deliveries is stored. For example, in the delivery database DB1, there is stored information such as a package ID for uniquely identifying a package, a delivery person ID for uniquely identifying a person responsible for the delivery, a delivery order, a desired delivery date and time designated by the receiving person, a position of a delivery destination, an arrival time at the delivery destination, a staying time period at the delivery destination, a delivery status, a name of the receiving person, and an electronic mail address of the receiving person.

The delivery order is the order in a series of deliveries for which a certain delivery person is responsible. The delivery order may be input by the delivery person or an administrator, or may be automatically determined based on a desired delivery date and time, a route search algorithm, or the like. The position of the delivery destination may be any information that allows identification of the position, and may be, for example, an address, latitude and longitude, or coordinates. In at least one embodiment, there is described a case in which both the address and the latitude and longitude are stored as the position of the delivery destination.

The delivery status is information indicating a delivery situation of the package. In at least one embodiment, there is described a case in which there are prepared three statuses, namely, "now delivering", "delivery complete", and "delivery incomplete", but other statuses may exist. For example, the status is changed by the delivery person performing a predetermined operation from the delivery person terminal 20. When the package is provided with a barcode or a two-dimensional code, a code reader may be included on the delivery person terminal 20 and the status may be changed by the delivery person reading the barcode or the two-dimensional code.

FIG. 7 is a table for showing a data storage example of the position database DB2. As shown in FIG. 7, the position database DB2 is a database in which position data detected by the position detector 26 is stored. For example, the position database DB2 stores the delivery person ID of the delivery person and position data received from the delivery person terminal 20 of the delivery person.

The position data is data indicating the position detected by the position detector 26. In at least one embodiment, there is described a case in which the position and the time are indicated in the position data, but it is not particularly required that the time be indicated in the position data. The position and the time may be expressed in any form. In at least one embodiment, the position is expressed by latitude and longitude, and the time is expressed in a form defined by the ISO or other such standard.

For example, the delivery person ID is stored in the delivery person terminal 20, and when the delivery person departs for delivery, the delivery person terminal 20 formally acquires the latest position data and transmits the acquired position data to the server 10 together with the delivery person ID. When the delivery person ID and the position data are received, the server 10 stores the received delivery person ID and position data in the position database DB2. Subsequently, during the period until the delivery person finishes the delivery task of the last delivery destination, position data is periodically transmitted from the delivery person terminal 20 to the server 10 and stored in the position database DB2. In this way, the position of the delivery person is stored in time series in the position database DB2.

In FIG. 1, there is illustrated only one delivery person terminal 20, but when a plurality of delivery person terminals 20 are included in the estimating system S, the server 10 receives the delivery person ID and the position data from each of the plurality of delivery person terminals 20 and stores the received delivery person IDs and position data in the position database DB2. Further, the delivery person ID is not required to be stored in the position database DB2.

FIG. 8 is a table for showing a data storage example of the staying time period database DB3. As shown in FIG. 8, the staying time period database DB3 is a database in which the staying time period calculated for each of a plurality of staying places is stored. For example, the staying time period database DB3 stores the position of each of a plurality of staying places and the staying time period calculated for each of those points.

The "staying place" is a place at which a delivery person is estimated to have stayed in the past. The staying place may be a certain point or may be an area having a certain size. The staying place may be indicated by latitude and longitude, coordinates, or an address. In at least one embodiment, the staying time period is estimated based on the movement situation of the delivery person in the past, and hence a staying place for which a staying time period is stored in the staying time period database DB3 is a place visited as a delivery destination by a certain delivery person in the past.

Places that are not a delivery destination, such as a gas station or a rest area, may also be stored as a staying place in the staying time period database DB3 when the delivery person stays for a certain period of time. However, in at least one embodiment, as a result of processing by the restriction module 103, which is described later, the staying time period for staying places that have not been a via point or a destination in past deliveries is not stored in the staying time period database DB3.

FIG. 9 is a table for showing a data storage example of the teacher data DT1. As shown in FIG. 9, the teacher data DT1 is data for learning the machine learning model M. The teacher data DT1 may also be referred to as "training data" or "learning data". In the teacher data DT1, pairs indicating a relationship between inputs (questions) and outputs (answers) are shown. The number of the pairs included in the teacher data DT1 may be any number, and may be, for example, several tens to several tens of thousands, or more. In at least one embodiment, pairs in which feature information on the staying places are inputs and the staying time period calculated for those points are outputs are stored in the teacher data DT1.

The feature information is information indicating a feature relating to a staying place. The feature information may indicate a feature of any perspective, for example, a geographical feature of the staying place, a feature of the building at the staying place, a temporal feature of time when the staying place is visited, and a feature of the weather condition at the staying place. In at least one embodiment, there is described a case in which the feature information indicates a geographical feature, for example, an attribute of the region or an attribute of the building of a point at which a delivery person has stayed.

The region attribute is a classification of a "region" to which the "staying place" belongs, and, for example, may be an attribute relating to population size, such as "urban" or "rural", or an attribute relating to an amount of traffic. The building attribute is a classification of the building at the staying place, and is an attribute relating to the size or the facilities of the building, such as the building's type, the number of floors, the number of rooms, presence or absence of an elevator, or a site area. The staying time period of the staying place varies depending on the attribute of the region or the building.

In at least one embodiment, there is described a case in which the feature information, such as the region attribute or the building attribute, is stored in the road network data DT2, but the feature information may be stored in another database or input by the administrator.

The data storage 100 stores the road network data DT2. The road network data DT2 is data having various information on roads as attributes. For example, the road network data DT2 contains a regulated speed, a road width, a link travel time, the number of lanes, and the like as attributes. The road network data DT2 may also be referred to as "geographic information system (GIS) data". The road network data DT2 itself is not shown because known data may be used.

In at least one embodiment, it is assumed that the road network data DT2 includes feature information on each point on the map. For example, for each point, an attribute of the region to which the point belongs and an attribute of the building at the point are stored in the road network data DT2. Those attributes may be input by the creator of the road network data DT2. In at least one embodiment, the road network data DT2 also includes the map data, but the road network data DT2 may be separate from the map data.

The data storage 100 also stores a program (algorithm), a parameter, and the like of the machine learning model M. In this example, there is described a case in which a machine learning model M that has been learned (parameter has been adjusted) by the teaching data DT1 is stored in the data storage 100, but a pre-learning machine learning model M (before parameter adjustment) may be stored in the storage 100.

For example, the machine learning model M is a model learned by supervised machine learning. The machine learning model M includes a program and parameters, and adjustment of the parameters is performed by learning processing based on the teacher data DT1. As the machine learning, various known techniques are applicable, and a convolutional neural network or a recursive neural network can be used, for example.

In at least one embodiment, pairs of feature information on the staying places at which a delivery person has stayed in the past as inputs and the staying time periods calculated for those staying places as outputs are stored in the teacher data DT1. Therefore, in the machine learning model M, the relationship between those inputs and outputs is learned. For example, in the machine learning model M, the relationship between the second feature information of the staying places at which the delivery person (same delivery person as the in-motion delivery person) or another delivery person (delivery person different from the in-motion delivery person) has stayed at the staying place for the staying time periods.

[3-2. Reference Module]

The reference module 101 is mainly implemented by the controller 11. The reference module 101 is configured to refer to the position database DB2. The position database DB2 stores position data. The position data includes at least one of: i) first position data indicating a first relationship between a position of the mobile object and time, and ii) second position data indicating a second relationship between a position of another mobile object and time.

In at least one embodiment, the delivery person is an example of a mobile object. The mobile object may be any object moving toward a destination, and may be a machine rather than a human. For example, the mobile object may be a vehicle such as a car or a motorbike, an unmanned vehicle configured to move based on autonomous driving, or an unmanned aerial vehicle, which is so-called "drone". In at least one embodiment, a situation in which packages are delivered is described as an example, and hence the mobile object is a delivery person or machine (e.g., delivery vehicle or unmanned aerial vehicle) delivering a package to each of a plurality of delivery destinations in order. The term "delivery person" as used in at least one embodiment may be read as "mobile object".

In at least one embodiment, the position database DB2 is stored in the data storage 100. Therefore, the reference module 101 refers to the position database DB2 stored in the data storage 100. When the position database DB2 is stored in an external computer other than the server 10, the reference module 101 transmits to the external computer a request to refer to the position database DB2. The reference module 101 acquires any number of pieces of position data stored in the position database DB2.

[3-3. Calculation Module]

The calculation module 102 is mainly implemented by the controller 11. The calculation module 102 is configured to calculate, based on the position data, a plurality of staying time periods, wherein respective ones of the plurality of staying time periods corresponds to respective ones of a plurality of staying places. The number of pieces of position data to be used in the calculation of the staying time periods may be any number. For example, all the position data accumulated in the position database DB2 may be used, or a part of the position data may be used. When a part of the position data is used, position data not yet used in the calculation of the staying time periods may be used, or the position data for the latest predetermined period may be used.

For example, the calculation module 102 statistically analyzes the position data to identify the staying places at which the delivery person has stayed, and calculates the staying time period for each of those identified staying places. In at least one embodiment, the calculation module 102 clusters the position data into a plurality of clusters. Each cluster corresponds to respective portions of the position data. The calculation module 102 calculates, for each cluster of the plurality of clusters and based on the respective portions of the position data, the plurality of staying time periods. Respective ones of the plurality of staying time periods correspond to respective ones of the plurality of staying places.

"Clustering" is the classification of data based on a predetermined condition. In other words, in clustering, data having similar content is grouped. A "cluster" is a collection of data having similar content, and can also be called "classification" or "group". In at least one embodiment, DBSCAN, which is an example of density-based clustering, is described as an example of clustering, but a known method may be used as the clustering algorithm itself. For example, the clustering may be performed by using another method, such as a hierarchical method like ac or a non-hierarchical method like a k-means method.

The staying place corresponding to the cluster is a staying place determined based on the position data belonging to the cluster. In other words, the staying place corresponding to the cluster is a staying place at which the delivery person is estimated to stay. The staying place corresponding to the cluster may be an average value of the positions indicated by a plurality of pieces of position data belonging to the cluster, or may be a position indicated by any one piece of position data belonging to the cluster.

In the example of FIG. 3, the calculation module 102 performs clustering on a plurality of pieces of position data acquired by the reference module 101 with reference to the position database DB2, to thereby identify the clusters C1 to C5. The calculation module 102 calculates the staying time period of the staying place corresponding to the cluster C1 based on the plurality of pieces of position data belonging to the cluster C1. For example, the calculation module 102 calculates, as the staying time period of the cluster C1, a time obtained by subtracting the earliest time from the latest time among the times indicated by each of the plurality of pieces of position data belonging to the cluster C1. The calculation module 102 also calculates the staying time period for the other clusters C2 to C5 based on the same processing.

The method of calculating the staying time period is not limited to the example described above, and the staying time period may be calculated by any method based on the times indicated by the position data belonging to the same cluster. For example, the difference between the second latest time and the earliest time may be obtained as the staying time period, or the difference between the latest time and the second earliest time may be obtained as the staying time period. In addition, the calculation module 102 can calculate the staying time period by any method.

The staying time period may be calculated without particularly using clustering. For example, the calculation module 102 may identify a first staying place of the plurality of staying places by determining, based on the position data, whether one of the mobile object and the another mobile object has been within a certain range of the first staying place, wherein the certain range is associated with a movement speed less than a predetermined threshold. In this case, the calculation module 102 calculates, for the first staying place, a first staying time period of the first staying place based on the position data.

For example, the calculation module 102 calculates, based on a plurality of pieces of position data, a movement distance per unit time of the delivery person (i.e., movement speed), and when a state in which the movement distance per unit time is less than a threshold value (i.e., state in which movement speed is approximately zero) continues for a certain period of time, the calculation module 102 determines that the delivery person is within the certain range.

When the movement distance per unit time changes from less than the threshold value to equal or more than the threshold value, the calculation module 102 determines that the delivery person has left the certain range, and calculates the staying time period until that time. In this case, the staying time period may be calculated by the calculation module 102 as the time from when the movement distance per unit time became less than the threshold value to the when the movement distance per unit time becomes equal to or more than the threshold value.

The calculation module 102 is not required to calculate the staying time periods of all the staying places, and may calculate the staying time periods for only a part of the staying places. In this case, the calculation module 102 may calculate the staying time period only for a randomly selected cluster, or may calculate the staying time period only for a cluster corresponding to a via point or a destination in past deliveries.

The calculation module 102 may exclude, from the clustering processing, places having a low probability of becoming a destination or a via point, which are described later, at the time of clustering. For example, the calculation module 102 excludes, from the clustering processing, position data indicating a position separated from the via points or destinations in the past deliveries. The calculation module 102 may also, regardless of past deliveries, perform the clustering processing on places at which there is a high probability that a person is present, and exclude, from the clustering processing, places at which there is low probability that a person is present.

A place at which there is a high probability that a person is present is, for example, a private house, a company, or a place at which there is some kind of facility, and a place at which there is a low probability that a person is present is, for example, a place other than such facilities. In at least one embodiment, an attribute of each point (e.g., type of building) is shown in the road network data DT2. Therefore, the calculation module 102 refers to the road network data DT2, and performs clustering processing on places having a predetermined attribute for which there is a high probability that a person is present, but excludes places having other attributes from the clustering processing. The calculation module 102 may also determine, for example, whether or not a place is in an area determined in advance (area in which a person is considered to be present) without particularly using an attribute, and perform clustering on such an area but exclude other areas from the clustering processing.

[3-4. Restriction Module]

The restriction module 103 is mainly implemented by the controller 11. The restriction module 103 is configured to restrict use, in estimation of the staying time period, of a staying time period having a low probability (likelihood or possibility) of becoming one of a destination and a via point, wherein low probability corresponds to a corresponding destination or via point not corresponding to a past delivery destination.

A staying place having a low probability of being a destination or a via point is, for example, a place at which nobody is considered to be present or a place which a delivery person considered to not be visit. The staying place may be determined by any method, and for example, the staying place may be determined based on past deliveries, or may be determined based on place information regardless of past deliveries. There is now described a case of a staying place that does not correspond to past via points or destinations of the delivery person or another delivery person (hereinafter referred to as "past delivery destinations"), as an example of a staying place at which there is a low probability that a person is present.

A past delivery destination is a delivery destination on the delivery route at the time when position data is acquired. In other words, a past delivery destination is a delivery destination that the delivery person or another delivery person has actually visited and stayed. The past delivery destination is identified by referring to the delivery database DB1.

A staying place that does not correspond to a past delivery destination is a staying place that does not match the past delivery destinations, or is a staying place that is far from the past delivery destinations. For example, the fact that the delivery destination is not included in (does not belong to) a cluster corresponds to the staying place not corresponding to a delivery destination. As another example, the fact that the delivery destination is separated from the past delivery destinations by a predetermined distance or more corresponds to the staying place not corresponding to a delivery destination.

Use by the staying time period estimating module 109 in estimation is equivalent to referring during estimation of the staying time period. The term "restrict" refers to preventing usage. In at least one embodiment, the restriction module 103 excludes the staying places not corresponding to a past delivery destination from the calculation of the staying time period by the calculation module 102. Specifically, a staying time period is not calculated for staying places that do not correspond to a past delivery destination.

In at least one embodiment, clusters are identified by the calculation module 102, and hence the restriction module 103 determines whether or not each of the plurality of clusters corresponds to a past delivery destination. For example, the restriction module 103 determines that a cluster corresponds to a past delivery destination when a distance between the position of the cluster and the position of a past delivery destination is less than a threshold value, and determines that the cluster does not correspond to a past delivery destination when the distance is equal to or more than the threshold value. The restriction module causes the calculation module 102 to calculate a staying time period for the staying places corresponding to a past delivery destination, and does not cause the calculation module 102 to calculate a staying time period for the staying places not corresponding to a past delivery destination.

The calculation module 102 may calculate the staying time period for all the clusters regardless of whether or not the staying places correspond to a past delivery destination. In this case, the restriction module 103 may be configured not to store in the staying time period database DB3 the staying time periods of the staying places not corresponding to a past delivery destination, and may be configured not to cause the machine learning model M to learn the staying time periods of the staying places not corresponding to a past delivery destination.

The restriction module 103 may permit the staying time period of a staying place at which there is a high probability that a person is present to be used in the estimation, and restrict the use of the staying time period of a staying place at which there is a low probability that a person is present in the estimation. The method of determining whether or not a place is a place at which there is a high probability that a person is present is as described above, and may be performed depending on whether or not the attribute indicated by the road network data DT2 is a predetermined attribute, based on whether or not the place is a place at which there is a high probability that a person is present, or based on whether or not the place is in an area determined in advance without particularly using an attribute.

[3-5. Learning Module]

The learning module 104 is mainly implemented by the controller 11. The learning module 104 is configured to execute learning processing of the machine learning model M based on the teacher data DT1. As the learning processing itself, various known methods are applicable. For example, a method used in a neural network or the like may be used. The learning module 104 adjusts the parameters of the machine learning model M so as to obtain a relationship between the inputs and the outputs of the teacher data DT1.

The teacher data DT1 is created based on the position and the staying time period of each staying destination stored in the staying time period database DB3 and the feature information stored in the road network data DT2. For example, the server 10 acquires the position of any staying place stored in the staying time period database DB3, and acquires the feature information on the staying place stored in the road network data DT2. The server 10 creates a pair in which the acquired position and feature information are inputs and the staying time period stored in the staying time period database DB3 is an output. The server 10 similarly creates pairs for the other staying places to create the teacher data DT1. The teacher data DT1 may also be created manually by the administrator.

[3-6. Via-Point Acquisition Module]

The via-point acquisition module 105 is mainly implemented by the controller 11. The via-point acquisition module 105 acquires a position of a via point. The via point is on a route to a destination. The route is a path followed by a mobile object when the mobile object moves toward the destination.

A destination is a place for which an arrival time is to be estimated. A destination may be a place to which the delivery person finally arrives, or may be one of the via points. There is at least one via point before a destination. There may be only one via point or a plurality of via points before a destination. In at least one embodiment, a destination is any one of the plurality of delivery destinations, and each delivery destination that is second or later in the delivery order corresponds to a destination. In the example of FIG. 2, each of the delivery destinations Q2 to Q5 corresponds to a destination.

A via point is a place that a delivery person visits before arriving at a destination. When there are a plurality of via points, the via points correspond not only to the place visited immediately before a destination, but also to the places visited two or more places before. A via point is not a place that a delivery person just passes through without any purpose, or rather, the via point is a place at which the delivery person stays for a certain period of time with a predetermined purpose. For example, at a via point, an operation such as package delivery, cash-on-delivery processing, or package pickup is performed. The delivery person may stay at the via point for about several seconds to one minute, or may stay at the via point for about several minutes to several hours. The via point may also be a place at which the delivery person rests or refuels the delivery vehicle and a task is not particularly performed.

In at least one embodiment, a via point is, among the plurality of delivery destinations, a delivery destination earlier in a delivery order than the delivery destination corresponding to the destination. In the example of FIG. 2, each of the delivery destinations Q1 to Q4 corresponds to a via point. For example, when the destination is the delivery destination Q2, the via point is the delivery destination Q1.

For example, when the destination is the delivery destination Q3, the via points are the delivery destinations Q1 and Q2. For example, when the destination is the delivery destination Q4, the via points are the delivery destinations Q1 to Q3. For example, when the destination is the delivery destination Q5, the via points are the delivery destinations Q1 to Q4. When there is a delivery destination after the delivery destination Q5, the delivery destination Q5 can also be a via point.

In at least one embodiment, the positions of the via points are stored in the delivery database DB1, and hence the via-point acquisition module 105 acquires the position of a via point by referring to the delivery database DB1. When the positions of the via points are stored in an external computer other than the server 10, the via-point acquisition module 105 transmits to the external computer a reference request for the position of the via point, and acquires the position of the via point from the external computer. The via points may also be input to a computer, for example, the delivery person terminal 20, and the current position acquisition module 106 may acquire the input via points.

[3-7. Current Position Acquisition Module]

The current position acquisition module 106 is mainly implemented by the controller 11. The current position acquisition module 106 is configured to acquire the current position of an delivery person. The current position of the delivery person is the position detected by the position detector 26. In at least one embodiment, the delivery person terminal 20 periodically acquires the current position and transmits the acquired current position to the server 10, and hence the current position acquisition module 106 periodically acquires the current position from the delivery person terminal 20.

In at least one embodiment, the current position acquisition module 106 stores the acquired position data in the position database DB2. The current position acquisition module 106 may store the acquired position data as it is in the position database DB2, or may first perform map matching to correct the position data to a road position and then store the corrected position data in position database DB2.

The delivery person terminal 20 may transmit the current position in response to a request from the server 10 in place of transmitting the current position spontaneously. In this case, the current position acquisition module 106 transmits an acquisition request for the current position to the delivery person terminal 20. When the delivery person terminal 20 receives the acquisition request, the delivery person terminal 20 transmits the current position detected by the position detector 26 to the server 10. The current position acquisition module 106 acquires the current position transmitted in response to the acquisition request.

In at least one embodiment, the current position is indicated in the position data, and hence the position data acquired by the current position acquisition module 106 includes the position detected by the position detector 26. The current position acquisition module 106 may directly acquire the position data from the delivery person terminal 20, or may indirectly acquire the position data via another computer. The current position of the delivery person may also be input to a computer, for example, the delivery person terminal 20, and the current position acquisition module 106 may acquire the input current position.

[3-8. Destination Acquisition Module]

The destination acquisition module 107 is implemented mainly by the controller 11. The destination acquisition module 107 is configured to acquire the positions of the destinations. In at least one embodiment, the positions of the destinations are stored in the delivery database DB1, and hence the destination acquisition module 107 acquires the positions of the destinations by referring to the delivery database DB1. When the positions of the destinations are stored in an external computer other than the server 10, the destination acquisition module 107 transmits to the external computer a reference request for the position of the destination, and the position of the destination is acquired from the external computer. The destinations may also be input to a computer, for example, the delivery person terminal 20, and the destination acquisition module 107 may acquire the positions of the input destinations.

[3-9. Movement Time Period Estimating Module]

The movement time period estimating module 108 is mainly implemented by the controller 11. The movement time period estimating module 108 is configured to estimate a movement time period based on the current position of the delivery person and the position of the destination. The "estimation" in this case refers to calculating the movement time period corresponding to the current position of the delivery person and the position of the destination. The movement time period estimating module 108 may also calculate the movement time period by acquiring traffic data (so-called "VICS (trademark) data") indicating a traffic condition of the roads, or may calculate the movement time period in consideration of a weather condition or other factors.

The movement time period is a period of time required for the movement, and does not include the staying time period. For example, the movement time period is the total time of a period of time required in order to arrive at a via point from the current position and a period of time required in order to arrive at a destination after departing the via point. When there are a plurality of via points, a period of time from departure from a certain via point until arrival at the next via point is added to the total time.

For example, the movement time period estimating module 108 calculates a distance from the current position of the delivery person until a destination based on the road network data DT2, and estimates the movement time period by dividing the calculated distance by a predetermined movement speed. This distance is a distance on the delivery route, but the distance may be a linear distance. The movement speed may be uniform over all sections, or may differ depending on the section. When the movement speed differs depending on the section, for example, a standard movement speed for each section is indicated in the road network data DT2.

[3-10. Staying Time Period Estimating Module]

The staying time period estimating module 109 is mainly implemented by the controller 11. The staying time period estimating module 109 is configured to estimate, based on the position of the via point, a staying time period. The staying time period represents an estimate of a time that the mobile object will stay at the position of the via point. The estimate of the staying time period is based on a history of the delivery person terminal 20. The "estimation" in this case refers to the acquisition of the staying time period corresponding to the via point.

The staying time period has a length corresponding to the position of the via point. In other words, the staying time period has a length determined based on the position of the via point. The staying time period may be the same for all via points by chance, or may be different for each via point. A relationship between the position of each of the plurality of staying places and the staying time period is stored in the data storage 100, and the staying time period estimating module 109 estimates the staying time period corresponding to the position of the via point based on that relationship.

The relationship between the position of each of the plurality of staying destinations and the staying time period may be indicated in any form. For example, the relationship may be indicated in the form of a table or a mathematical expression, or may be indicated as a part of a program code. In at least one embodiment, there is described a case in which the relationship is indicated in the staying time period database DB3, but the relationship may be indicated in the machine learning model M. More specifically, in the machine learning model M, not only the feature information on the via point but also the relationship between the position of the via point and the staying time period may be learned.

For example, the staying time period estimating module 109 estimates the staying time period at the via point based on: i) the plurality of staying time periods and ii) the position of the via point. For example, the staying time period of each of the plurality of staying places is stored in the staying time period database DB3, and hence the staying time period estimating module 109 acquires the staying time period associated with the position of a via point by referring to the staying time period database DB3.

For example, the staying time period estimating module 109 estimates the staying time period based on first feature information associated with the via point, wherein the first feature information is associated with the position of the via point. This feature information is associated with the position of the via point. The relationship between the feature information and the staying time period may be indicated in any form, for example, in the form of a table or mathematical expression, or may be indicated as a part of a program code. In at least one embodiment, there is described a case in which the relationship is indicated in the machine learning model M, but the table or the like may be used without particularly using the machine learning model M.

The staying time period estimating module 109 inputs the feature information on the via point to the machine learning model M, and acquires the staying time period output from the machine learning model M. When the feature information on the via point is input, the machine learning model M represents the input feature information as a feature amount, for example, a vector, and outputs the staying time period based on the feature amount. The staying time period estimating module 109 estimates the staying time period at the via point by acquiring the staying time period output from the machine learning model M. The feature amount may be calculated by an algorithm other than the machine learning model M, and input to the machine learning model M.

In at least one embodiment, the feature information indicates an attribute, and the staying time period estimating module 109 estimates the staying time period based on the attribute of the region or the building of the via point. For example, in the machine learning model M, a relationship between the attribute of the region or the building of a staying place to which a delivery person or another delivery person has moved in the past and an actual staying time period at the staying place is learned. The staying time period estimating module 109 inputs the attribute of the region or the building of the via point to the machine learning model M, and acquires the staying time period output from the machine learning model M. When the attribute of the region or the building of the via point is input, the machine learning model M calculates a feature amount, and outputs the staying time period based on the feature amount.

For example, when the via point is a city, the staying time period is longer than when the via point is in the countryside. As another example, when the via point is an apartment building or an office building, the staying time period is longer than when the via point is a stand-alone house. As another example, the staying time period becomes longer as the number of floors or rooms of the via point period larger. As another example, the staying time period is longer when there is no elevator at the via point than when there is an elevator at the via point.

The staying time period estimating module 109 may acquire both of the staying time period acquired by using the staying time period database DB3 and the staying time period acquired by using the machine learning model M, or acquire the average value of those as the staying time period. The staying time period estimating module 109 may also acquire the staying time period by using only the staying time period database DB3, or may acquire the staying time period by using only the machine learning model M. In at least one embodiment, restriction by the restriction module 103 is performed, and hence the staying time period estimating module 109 estimates the staying time period based on staying time periods that have not been restricted by the restriction module 103.

[3-11. Arrival Time Estimating Module]

The arrival time estimating module 110 is mainly implemented by the controller 11. The arrival time estimating module 110 is configured to estimate, by including the staying time period, an arrival time of the mobile object at the destination. The arrival time is a time obtained by adding the staying time period to the movement time period until the destination. In at least one embodiment, the arrival time estimating module 110 estimates the arrival time based on the movement time period estimated by the movement time period estimating module 108 and the staying time period.

In at least one embodiment, the arrival time of the in-motion delivery person is estimated in real time, and hence the arrival time estimating module 110 estimates the arrival time by adding the movement time period and the staying time period to the current time. The arrival time estimating module 110 may also estimate the arrival time for a future date, for example, the next day. In this case, the arrival time estimating module 110 estimates the arrival time by adding the movement time period and the staying time period to a predetermined departure time. The departure time may be input by the delivery person or the administrator, or may be acquired from data in which the time at which the delivery person is to start work is stored.

The movement time period may be acquired based on any method determined in advance. In at least one embodiment, there is described a case in which the movement time period is estimated by the movement time period estimating module 108, but the movement time period may be input by the administrator, or a database may be used in which an average movement time period between the staying places is stored. As another example, the machine learning model M in which the movement time period between the staying places has been learned may be used.

[3-12. Notification Module]

The notification module 111 is mainly implemented by the controller 11. The notification module 111 is configured to notify the receiving person, before the delivery person arrives at the destination and wherein the user is associated with a destination of the arrival time. The receiving person is an example of a user associated with the destination. The user associated with the destination may be a person determined based on the destination. For example, the user may be a person at the destination or a person not at the destination.

In at least one embodiment, there is described a case in which a notification using electronic mail is described as an example, but the notification may be performed by any method. For example, a message application, an SNS, a push notification on the receiving person terminal 30, or a notification in an application installed on the receiving person terminal 30 may be used. Further, in at least one embodiment, there is described a case in which a visual notification is performed, but an aural notification may be performed by using sound, such as in a telephone call or a voice mail, or a tactile notification may be performed by using a vibrator or the like.

The notification module 111 may perform the notification at any timing, for example, when an arrival time is approaching, when the delivery person is approaching the delivery destination, or when an application of the receiving person terminal 30 has been activated. As another example, the notification module 111 may immediately perform a notification of the arrival time as soon as the arrival time is estimated, or the notification may be performed when a predetermined time has come.

4. Processing to be Executed in Present Embodiment

Next, processing to be executed in at least one embodiment is described. In this case, there is described pre-processing of calculating a staying time period by clustering position data, and estimation processing of estimating an arrival time in a case in which the delivery person delivers a package.

[4-1. Pre-Processing]

Figure 10:
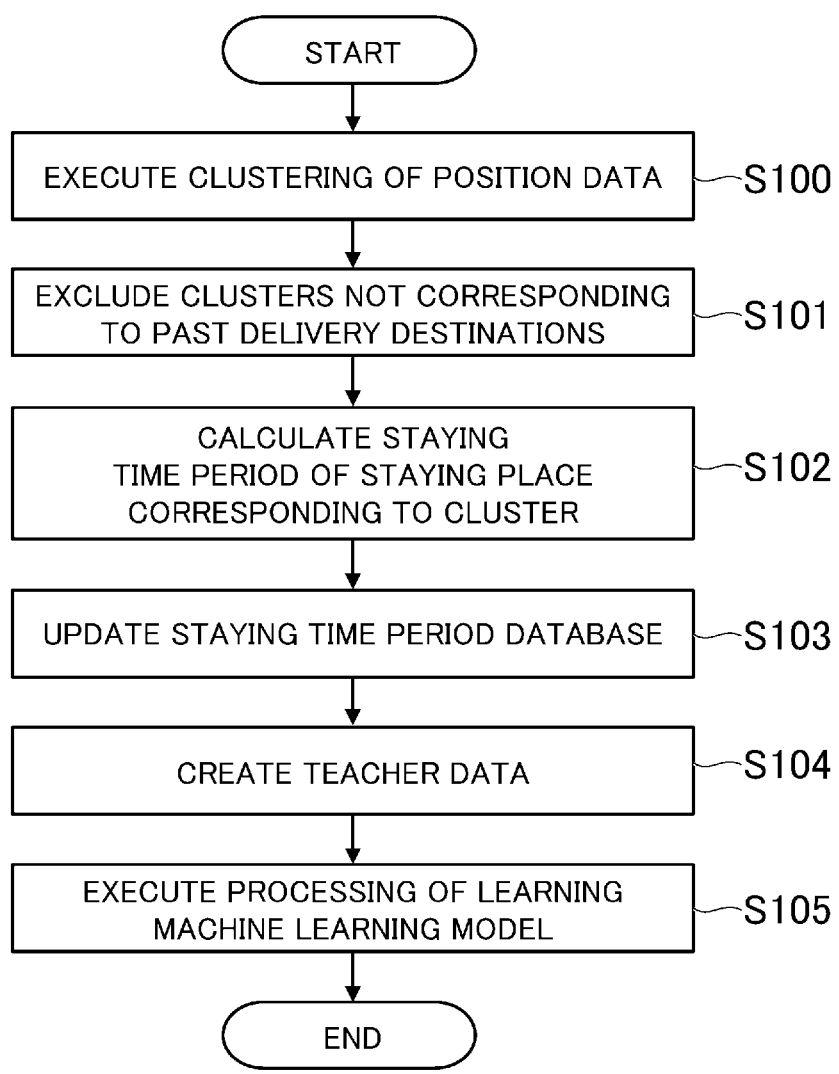
FIG. 10 is a flowchart for illustrating an example of pre-processing.

FIG. 10 is a flowchart for illustrating an example of pre-processing. As illustrated in FIG. 10, the pre-processing is executed by the controller 11 operating in accordance with programs stored in the storage 12. The pre-processing is an example of the processing to be executed by the functional blocks illustrated in FIG. 5. The pre-processing may be executed at any timing. For example, the pre-processing may be executed as batch processing overnight, or may be executed when the administrator performs a predetermined operation.

As illustrated in FIG. 10, first, the controller 11 executes clustering of position data based on the position database DB2 (Step S100). In Step S100, the controller 11 executes clustering of position data based on a known clustering method, for example, DBSCAN. The controller 11 records in the storage 12 a relationship between each of a plurality of clusters and the position data belonging to those clusters.

The controller 11 excludes, based on the delivery database DB1, clusters that do not correspond to past delivery destinations from the staying time period calculation target (Step S101). In Step S101, the controller 11 refers to the delivery database DB1 and determines whether or not a delivery destination that has been used as a via point or a destination in past deliveries corresponds to a cluster identified in Step S100. The controller 11 excludes clusters not corresponding to past delivery destinations from the staying time period calculation target, and sets the clusters corresponding to a past delivery destination as a staying time period calculation target.

The controller 11 calculates, for each cluster for which the staying time period is to be calculated, the staying time period of the staying place corresponding to the cluster based on the position data belonging to the cluster (Step S102). In Step S102, the controller 11 calculates, for each cluster, the difference between the earliest time and the latest time of the position data belonging to the cluster. The controller 11 also calculates an average value of the positions indicated by the position data belonging to a cluster as the staying place corresponding to the cluster.

The controller 11 updates the staying time period database DB3 based on the staying time period of each staying place calculated in Step S101 (Step S103). The controller 11 stores, in the staying time period database DB3, a pair of the staying place corresponding to each cluster for which the staying time period has been calculated and the staying time period calculated for the cluster.

The controller 11 creates teacher data DT1 based on the staying time period database DB3 and the road network data DT2 (Step S104). In Step S104, the controller 11 refers to the road network data DT2 and acquires feature information on the position of the staying place for which the staying time period is stored in the staying time period database DB3. The controller 11 creates the teacher data DT1 by creating pairs of the acquired feature information as inputs and the staying time period of the staying place as outputs. The number of created pairs corresponds to the number of staying places.

The controller 11 executes, based on the teacher data DT1 created in Step S104, processing of learning the machine learning model M (Step S105), and then ends this processing. In Step S104, the controller 11 uses a known supervised machine learning method to adjust the parameter of the machine learning model M so as to obtain the relationship between the input and the output indicated by the pair of the teacher data DT1.

[4-2. Estimation Processing]

Figure 11:
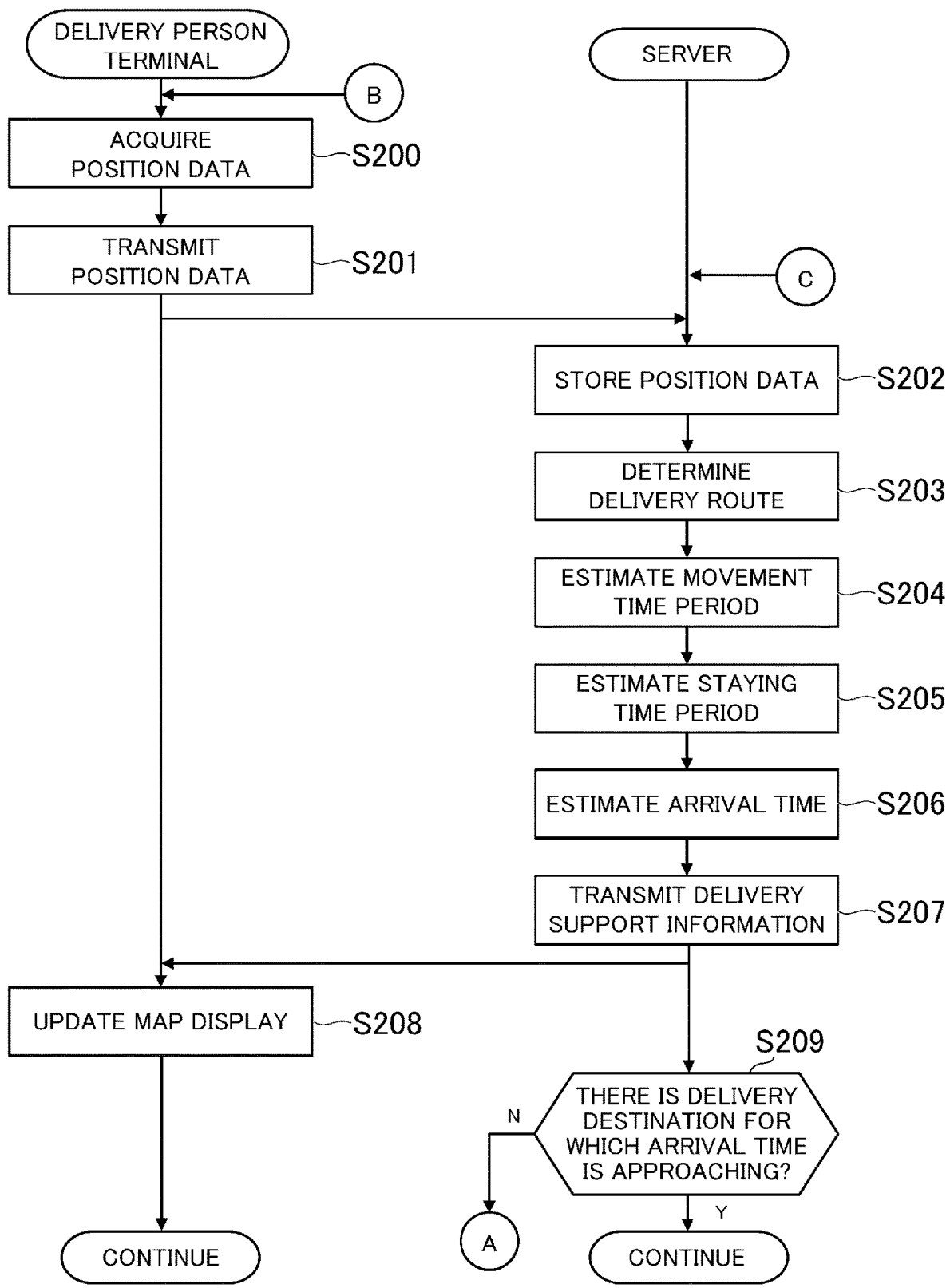
FIG. 11 is a flowchart for illustrating an example of estimation processing.
Figure 12:
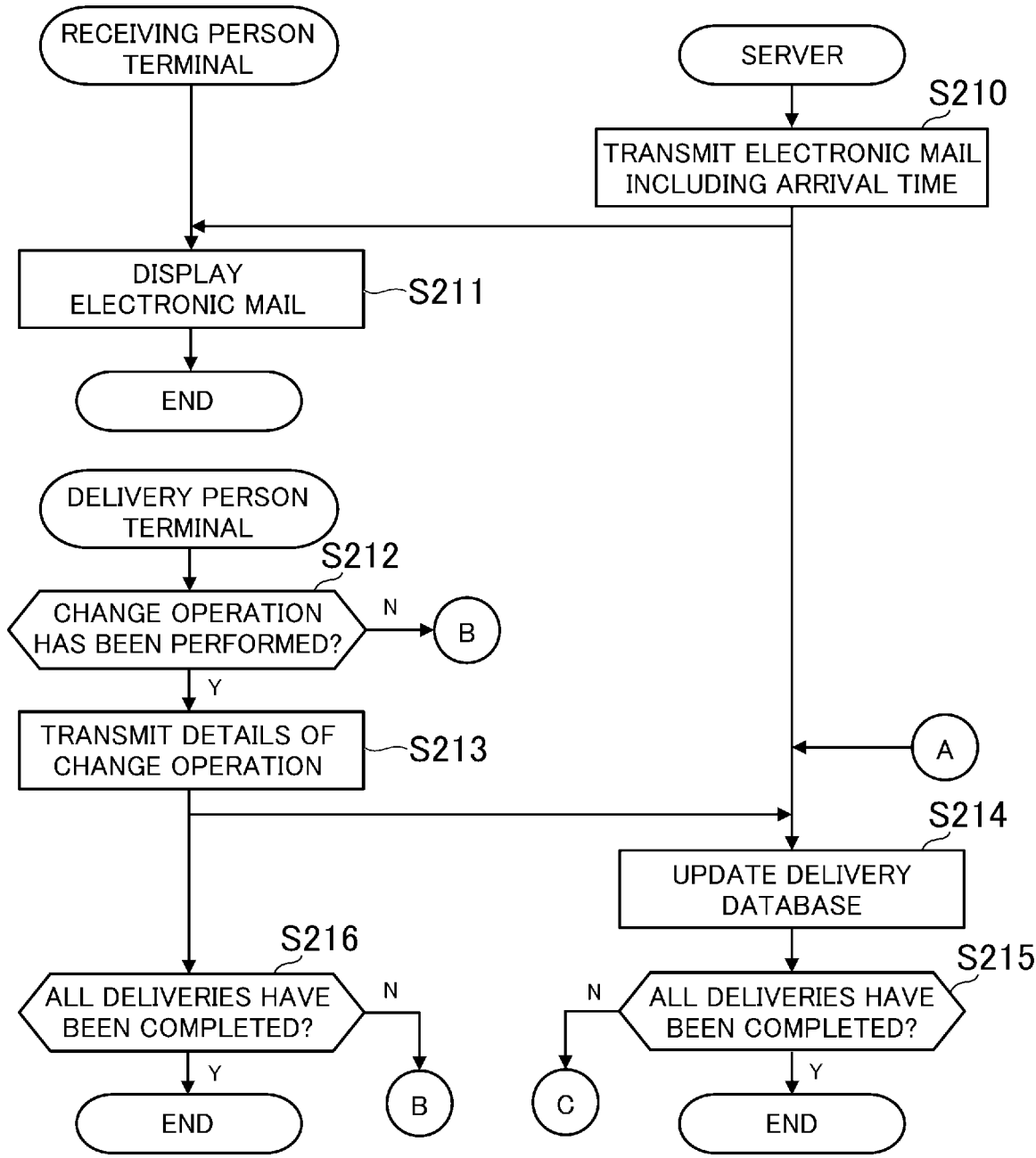
FIG. 12 is a flowchart for illustrating an example of estimation processing.

FIG. 11 and FIG. 12 are flowcharts for illustrating an example of estimation processing. The processing illustrated in FIG. 11 and FIG. 12 is executed by the controllers 11, 21, and 31 operating in accordance with programs stored in the storages 12, 22, and 32. The processing described below is an example of the processing to be executed by the functional blocks illustrated in FIG. 5. The estimation processing may be executed at any timing, for example, when the delivery person departs for delivery with the delivery person terminal 20.

As illustrated in FIG. 11, first, in the delivery person terminal 20, the controller 21 acquires, based on the detection signal of the position detector 26, position data indicating the current position of the delivery person (Step S200). In Step S200, the controller 21 acquires, based on a signal from a satellite received by the position detector 26, position data indicating the current time and the current latitude and longitude.

The controller 21 transmits the position data acquired in Step S200 to the server 10 (Step S201). In the storage 22 of the delivery person terminal 20, the delivery person ID is stored, and in Step S201, the controller 21 transmits the position data together with the delivery person ID. In this way, the server 10 can identify the delivery person terminal 20 of the delivery person from which the position data is received.

In the server 10, when the position data from the delivery person terminal 20 is received, the controller 11 stores the position data in the position database DB2 (Step S202). In Step S202, the controller 11 stores the delivery person ID and the position data received from the delivery person terminal 20 in the position database DB2 in association with each other.

The controller 11 determines a delivery route R of the delivery person based on the delivery database DB1, the latest position data, and the road network data DT2 (Step S203). In Step S203, the controller 11 determines, based on a known route search algorithm, the delivery route R for moving from the position indicated by the latest position data to each delivery destination in an order stored in the delivery database DB1. In this example, there is described a case in which the processing of Step S203 to Step S207 is executed each time position data is received, but the processing of Step S203 to Step S207 may be executed at any timing. For example, the processing of Step S203 to Step S207 may be executed each time a certain time elapses, or executed when delivery at a certain delivery destination is completed. When a cancellation has occurred for a delivery destination, the delivery route R may be recalculated.

The controller 11 estimates, based on the delivery route R determined in Step S203, the movement time period between each pair of delivery destinations (S204). In Step S204, the controller 11 calculates the movement time period between each pair of delivery destinations by calculating the distance between each pair of delivery destinations indicated by the delivery route R, and dividing the calculated distance by a predetermined speed.

The controller 11 estimates a staying time period based on the position of a delivery destination serving as a via point (Step S205). In Step S205, for example, the controller 11 refers to the staying time period database DB3 and acquires the staying time period associated with the position of the delivery destination serving as the via point. As another example, the controller 11 inputs to the machine learning model M feature information associated with the position of the delivery destination serving as the via point, and acquires the staying time period output from the machine learning model M. The controller 11 may execute any one of those processes or execute both of those processes to calculate an average of staying time period. As described above, in at least one embodiment, the staying time period of a staying place not corresponding to a past delivery destination (e.g., a gas station or rest area that is identified as a cluster but is not a delivery destination) is not stored in the staying time period database DB3, and is not learned by the machine learning model M, and therefore such a staying time period is excluded in advance from the estimation processing.

The controller 11 estimates, based on the movement time period estimated in Step S204 and the staying time period estimated at Step S205, the arrival time of the delivery destination that is a destination (Step S206). In Step S206, the controller 11 acquires, as the arrival time of a certain delivery destination Qn, a time by adding to the arrival time of the previous delivery destination Qn−1 the staying time period of the delivery destination Qn−1 and the movement time period from the delivery destination Qn−1 until the delivery destination Qn. As the arrival time for the delivery destination Q1, which is the first via point, the controller 11 acquires the time by adding to the current time the movement time period until the delivery destination Q1.

The controller 11 transmits, to the delivery person terminal 20, delivery support information including the delivery route R determined in Step S203 and the arrival time and staying time period of each delivery destination (Step S207).

In the delivery person terminal 20, when the delivery support information is received, the controller 21 updates the display of the map MP on the display 25 based on the delivery support information (Step S208). In Step S208, the controller 21 displays on the map MP the delivery route R included in the delivery support information and the arrival time and staying time period of each delivery destination. The data of the map MP may be stored in advance in the storage 22 of the delivery person terminal 20, or may be provided from the server 10 to the delivery person terminal 20.

In the server 10, the controller 11 determines whether or not there is a delivery destination for which the arrival time is approaching (Step S209). In Step S209, the controller 11 acquires the current time by using a real-time clock or the like. The controller 11 determines whether or not there is an arrival time within a predetermined time from the current time in the delivery database DB1.

When there is a delivery destination for which the arrival time is approaching (Step S209: Y), the processing advances to FIG. 12, and the controller 11 transmits, based on the delivery database DB1, an electronic mail including the arrival time to the receiving person of delivery destination for which the arrival time is approaching (Step S210). In Step S210, the controller 11 refers to the delivery database DB1 and acquires the electronic mail address of the receiving person of the delivery destination for which the arrival time is approaching. The controller 11 transmits an electronic mail including arrival time to the electronic mail address. It is assumed that the format of the electronic mail is stored in advance in the storage 12.

In the receiving person terminal 30, when the electronic mail is received, the controller 31 displays the received electronic mail on the display 35 (Step S211). In Step S211, the screen illustrated in FIG. 4 is displayed, and the receiving person can grasp the precise arrival time.

Meanwhile, in the delivery person terminal 20, the controller 21 determines, based on the detection signal of the operation device 24, whether or not a change operation for changing the status of the package has been performed (Step S212). This operation is performed when the delivery person has performed a predetermined task at the delivery destination. For example, the operation is performed when the delivery of the package at the delivery destination is complete, or when the delivery destination is visited but the receiving person is absent. Of the data in the delivery database DB1, the data of the delivery for which the delivery person is responsible is assumed to be downloaded to the delivery person terminal 20. For this reason, the delivery person terminal 20 can identify the delivery destination and the like at which a change operation is to be performed.

When it is determined that a change operation has been performed (Step S212: Y), the controller 21 transmits details of the change operation to the server 10 (Step S213). In Step S213, the controller 21 transmits the package ID of the package for which the change operation has been performed and information for identifying the status designated by the delivery person.

In the server 10, when the details of the change operation are received, the controller 11 updates the delivery database DB1 (Step S214). In Step S214, the controller 21 updates the status associated with the package ID. When the status is updated, the delivery person departs for the next delivery destination.

The controller 11 determines, based on the delivery database DB1, whether or not all the deliveries have been completed (Step S215). In the delivery person terminal 20, the controller 21 determines whether or not all the deliveries have been completed based on, of the data in the delivery database DB1, the data of the deliveries for which the delivery person is responsible (Step S216). In Step S215 and Step S216, the controller 11 determines whether or not the status of all the packages is a status other than "in motion".

When there is a delivery that has not yet been completed (Step S215, Step S216: N), the processing returns to Step S200, the delivery person terminal 20 acquires the latest position data, transmits the acquired position data to the server 10, and the server receives the latest position data. Moreover, when it is determined that all the deliveries have been completed (Step S215, Step S216: Y), this processing ends.

With the estimating system S described above, the arrival time at a destination is estimated based on the staying time periods corresponding to the positions of the via points of the delivery person moving toward a destination, and hence the estimation accuracy of the arrival time can be increased. For example, in place of simply summing movement time periods between the delivery destinations to estimate the arrival time as in the related art, estimating the arrival time by considering the staying time periods at the via points enables periods of time spent in stays at the via points to be reflected in the arrival time. Further, for example, unlike a technology in which the arrival time is recalculated by detecting the actual delivery status of the package by the delivery person as in the related art, it is possible to estimate a highly accurate arrival time even without detecting the actual delivery status. For this reason, for example, an accurate arrival time can be estimated even before the delivery person departs.

The estimating system S can estimate a highly accurate arrival time corresponding to the current position of an in-motion delivery person by estimating the movement time period based on the current position of the delivery person and the position of a destination, and estimating the arrival time based on the estimated movement time period and the staying time periods at the via points.

Further, the estimating system S can estimate the staying time periods based on past actual measurement values by calculating the staying time period of each of the plurality of staying places based on position data accumulated in the position database DB2 and estimating the staying time periods based on the positions of the via points. As a result, the accuracy of the staying time periods can be increased.

In addition, even when it is not known which staying places the delivery person is to stay at, the estimating system S can use position data to estimate the staying places at which the delivery person is considered to have stayed and calculate highly accurate staying time periods by clustering the position data accumulated in the position database DB2, and for each cluster, calculating a staying time period of the staying place corresponding to the cluster based on the times indicated by the position data belonging to the cluster.

The estimating system S can also calculate highly accurate staying time periods by determining whether or not the delivery person or another delivery person is within a certain range based on the position data accumulated in the position database DB2, and calculating the staying time periods.

The estimating system S can avoid using the staying time periods of staying places at which a delivery person accidently stayed for a purpose other than delivery to effectively increase the accuracy of estimating the arrival time, by restricting the use of staying time periods of staying places that do not correspond to past delivery destinations in the estimation of the staying time periods of the delivery person who is now heading out for delivery. For example, it is possible to reduce a memory consumption by not storing in the staying time period database DB3 the staying time periods of staying places not corresponding to past delivery destinations. Further, for example, the accuracy of the machine learning model M can be increased by causing the machine learning model M not to learn the staying time periods of staying places that do not correspond to the past delivery destinations. In addition, for example, it is possible to omit unnecessary calculations to reduce the processing load of the server 10 by not calculating the staying time periods of staying places not corresponding to the past delivery destinations.

The estimating system S can increase the estimation accuracy of a staying time period by estimating the staying time period based on the feature information associated with the position of the delivery destination serving as a via point. Even for a via point that no one has visited in the past, the staying time period can be estimated by using feature information.

The estimating system S can increase the estimation accuracy of a staying time period by acquiring the staying time period by using the machine learning model M in which the relationship between the feature information on the staying place and the actual staying time period is learned. Further, even for a via point that no one has visited in the past, a highly accurate staying time period can be estimated by using the feature information and the machine learning model M.

The estimating system S can further increase the estimation accuracy of a staying time period by acquiring the staying time period based on an attribute of the region or the building of the delivery destination serving as a via point. Even for a via point that no one has visited in the past, the staying time period can be estimated by using the attribute of the region or the building of the via point.

The estimating system S can increase the convenience of the receiving person of a destination by notifying the receiving person of the arrival time before the delivery person arrives at a destination. This also enables the package to be reliably delivered by the delivery person, to thereby prevent the occurrence of a redelivery.

The estimation accuracy of the arrival time during delivery can also be increased by applying the estimating system S to a situation in which the delivery person delivers the package, and when one of a plurality of delivery destinations corresponds to a destination, setting the delivery destinations earlier in the delivery order than the delivery destination corresponding to a destination to be via points.

5. Modification Examples

The present invention is not limited to at least one embodiment described above, and can be modified suitably without departing from the spirit of the present invention.

(1) For example, in at least one embodiment, there is described a case in which the staying time period is estimated by using the geographical feature of via points, but the staying time period may be estimated by using another feature. For example, the feature information may indicate a time slot or a time, and the staying time period estimating module 109 may be configured to estimate the staying time period based on the time slot or the time of staying at a via point. The time slot means a period having a certain length in one day. The time means a period to which the day on which the stay occurs belongs, and is, for example, a day of the week, a weekday, a weekend, a season, or a month. The time slot or the time of staying at the via point may be acquired based on the arrival time at the via point.

For example, in the machine learning model M, a relationship between the time slot or the time in which the delivery person or another delivery person moved to a staying place in the past and an actual staying time period at the staying place is learned. The staying time period estimating module 109 inputs the time slot or the time of moving to the via point in the machine learning model M, and acquires the staying time period output from the machine learning model M. The machine learning model M calculates the feature amount when the time slot or the time of moving to the via point is input, and outputs the staying time period based on the feature amount.

For example, when the stay at a via point is in a time slot at night, the staying time period is longer than when the stay at the via point is in a time slot during the day. As another example, when the stay at a via point is on a specific day of the week, the staying time period is longer than when the stay at the via point is on another day of the week. As another example, when the stay at a via point is on a holiday, the staying time period is longer than when the stay at the via point is on a weekday. As another example, when the stay at a via point is in a specific season, the staying time period is longer than when the stay at the via point is in another season. As another example, when the stay at a via point is in a specific month, the staying time period is longer than when the stay at the via point is in another month.

According to Modification Example (1) of the present invention, the estimation accuracy of a staying time period can be further increased by acquiring the staying time period based on the time slot or the time of moving to the delivery destination, which is a via point. Even for a via point that no one has visited in the past, it is possible to estimate the staying time period by using the time slot or the time of moving to the via point.

(2) For example, the feature information may indicate a weather condition, and the staying time period estimating module 109 may estimate the staying time period based on the weather condition at the via point. The weather condition is information such as the weather, temperature, humidity, wind direction, wind speed, amount of precipitation, amount of snowfall, or amount of accumulated snow. The weather condition may be input by the delivery person or the administrator, or weather condition information provided by a meteorological agency or a private company may be acquired.

For example, in the machine learning model M, a relationship between the weather condition at a staying place at which the delivery person or another delivery person has stayed in the past and the actual staying time period is learned. The staying time period estimating module 109 inputs the weather condition at the via point in the machine learning model M, and acquires the staying time period output from the machine learning model M. The machine learning model M calculates the feature amount when the weather condition at the via point is input, and outputs the staying time period based on the feature amount.

For example, the staying time period is longer when the weather is rainy at the staying via point than when the weather is sunny or cloudy at the staying via point. Further, for example, the staying time period becomes longer as the wind speed at the staying via point becomes stronger. In addition, for example, the staying time period becomes longer as the amount of precipitation or snowfall at the staying via point becomes larger.

According to Modification Example (2) of the present invention, the estimation accuracy of a staying time period can be further increased by acquiring the staying time period based on the weather condition at the delivery destination, which is a via point. Even for a via point that no one has visited in the past, it is possible to estimate the staying time period by using the weather condition at the via point.

(3) For example, the staying time period may differ depending on an attribute of the delivery person, and therefore the staying time period estimating module 109 may estimate the staying time period based on the position of the via point and the attribute of the delivery person. The attribute of the delivery person is a classification of the delivery person, and is, for example, information such as the ability, personality, gender, age, or physique of the delivery person. For example, information such as whether the delivery person is a newcomer or a veteran corresponds to an attribute of the delivery person. As another example, information such as emphasis on speed or emphasis on safety corresponds to an attribute of the delivery person. The attribute of the delivery person may be input by the delivery person or the administrator, or may be stored in advance in the data storage 100.

The relationship between the attribute of the delivery person and the staying time period may be indicated in any form, for example, in the form of a table or a mathematical expression, or may be indicated as a part of a program code. In this case, there is described a case in which the above-mentioned relationship is indicated in the machine learning model M, but the machine learning model M may not be used particularly.

The staying time period estimating module 109 inputs the attribute of the delivery person to the machine learning model M, and acquires the staying time period output from the machine learning model M. When the attribute of the delivery person is input, the machine learning model M calculates a feature amount, and outputs the staying time period based on the feature amount. The staying time period estimating module 109 estimates the staying time period at the via point by acquiring the staying time period output from the machine learning model M. For example, the staying time period is longer when the delivery person is a newcomer than when the delivery person is a veteran. Further, for example, the staying time period becomes longer as the length of employment of the delivery person becomes shorter. In addition, for example, the staying time period becomes longer as the ability of the delivery person becomes lower.

According to Modification Example (3) of the present invention, estimation accuracy of a staying time period can be further increased by estimating the staying time period based not only on the positions of via points but also on the attribute of the delivery person.

(4) Further, for example, the above-mentioned modification examples may be combined.

For example, there has been described a case in which the arrival time is estimated by acquiring the current position of an in-motion delivery person, but the arrival time for a future delivery of a delivery person who has not yet departed may be estimated. In this case, the arrival time may be estimated based on the place of a sales office or a scheduled departure time of the delivery person, without particularly acquiring the current position of the delivery person. Further, for example, there has been described a case in which the staying time period is calculated based on position data of past deliveries, but the delivery person may measure the staying time period and upload the measured staying time period to the server 10, or a staying time period input by the administrator may be registered in the staying time period database DB3. In addition, for example, there has been described a case in which the arrival time estimated by the server 10 is provided to both the delivery person and the receiving person, but the arrival time may be provided to only one of the delivery person and the receiving person.

Still further, for example, there has been described a case in which position data is acquired from the delivery person terminal 20, which is moving together with the delivery person, but the position data may be acquired from the delivery vehicle or the like. Still further, for example, there has been described a case in which the estimating system S is used in a situation of delivering packages, but the estimating system S may be used in any situation. For example, when the estimating system S is used in a situation of picking up packages, each destination and via point may be a place at which the delivery person picks up a package. As another example, when the delivery person is to pick up a package and then deliver the package, the destination may be the delivery destination of the package and the via point may be the pick-up place of the package.

The estimating system S may also be used in a situation not related to packages. For example, the estimating system S may be used for route guidance. In this case, when the user of the estimating system S inputs a destination and a via point from his or her own terminal, the server 10 estimates the staying time period at the via point and estimates the arrival time at the destination by performing the same processing as described in at least one embodiment and the modification examples. The route guidance may be route guidance for a case in which the user moves on foot, or may be route guidance for a case in which the user moves by riding in a vehicle such as a car or a motorcycle. As another example, the estimating system S may be used in an arbitrary situation, for example, a situation in which an employee of a company providing a predetermined service visits a plurality of contracting parties in turn.

There has been described a case in which the main functions are implemented by the server 10, but each function may be shared by a plurality of computers. For example, functions may be shared between the server 10 and the delivery person terminal 20. For example, the processing by the machine learning model M may be executed by the delivery person terminal 20 in place of the server 10. Further, for example, when the estimating system S includes a plurality of server computers, the functions may be shared by those plurality of server computers. In addition, for example, the data described as being stored in the data storage 100 may be stored by a computer other than the server 10.

While there have been described what are at present considered to be certain embodiments of the invention, it will be understood that various modifications may be made thereto, and it is intended that the appended claims coverall such modifications as fall within the true spirit and scope of the invention.

What is claimed is:

1. A system for accurate guidance of a route for a mobile object, the system comprising:
    at least one memory configured to store computer program code; and
    at least one processor configured to access said at least one memory and operate according to said computer program code, said computer program code including:
        via point acquisition code configured to cause the at least one processor to acquire a position of a via point, wherein the via point is a location of a planned interim stay on a route to a destination, wherein the route is a path followed by a mobile object when the mobile object moves toward the destination;
        learning code configured to cause the at least one processor to train and adjust a machine learning model based on training data including feature information and staying times for each of a plurality of staying places, each of the plurality of staying places corresponding to a past destination in a history of position data of at least one user terminal, the position data indicating a relationship between a position of the at least one user terminal and a time, the position data having been accumulated from the at least one user terminal for storage in a database, the machine learning model being thereby trained, based on the position data, to describe a relationship between feature information of an input staying place and a staying time of the input staying place;
        staying time period code configured to cause the at least one processor to estimate a staying time period for the via point, wherein the staying time period represents an estimate of a time that the mobile object will stay at the position of the via point, wherein the staying time period is estimated at least in part by inputting feature information on the via point to the machine learning model and acquiring the staying time outputted from the machine learning model; and
        arrival time code configured to cause the at least one processor to estimate, in real time, an arrival time of the mobile object at the destination, wherein the mobile object is currently in motion and the real-time estimate of the arrival time is based at least in part on the staying time period,
    wherein the route is adjusted based at least in part on the estimate of the arrival time, and information including the adjusted route is transmitted to a device associated with the mobile object to be displayed on a display of the device, and
    wherein the staying time period for the via point is estimated a plurality of times prior to completion of the route, at least a first estimate of the staying time period being based on the history of position data before receipt of an additional position data point from the at least one user terminal, at least a second estimate of the staying time period being based on the history of position data after receipt of the additional position data point from the at least one user terminal.

2. The system according to claim 1, wherein the computer program code further includes:
    current position acquisition code configured to cause the at least one processor to acquire a current position of the mobile object;
    destination acquisition code configured to cause the at least one processor to acquire a position of the destination; and
    movement time period code configured to cause the at least one processor to:
        estimate a movement time period based on the current position of the mobile object and on the position of the destination, and
        estimate the arrival time based on the movement time period and the staying time period.

3. The system according to claim 1, wherein
the training data is derived by calculating, based on the position data in the history of position data, a plurality of staying time periods, wherein respective ones of the plurality of staying time periods correspond to respective ones of the plurality of staying places.

4. The system according to claim 3, wherein the computer program code further includes calculation code configured to cause the at least one processor to:
cluster the position data into a plurality of clusters, wherein each cluster corresponds to respective portions of the position data; and
calculate, for each cluster of the plurality of clusters and based on the respective portions of the position data, the plurality of staying time periods.

5. The system according to claim 3, wherein the computer program code further includes calculation code configured to cause the at least one processor to:
identify a first staying place of the plurality of staying places by determining, based on the position data, whether the at least one user terminal has been within a certain range of the first staying place, wherein the certain range is associated with a movement speed less than a predetermined threshold; and
calculate, for the first staying place, a first staying time period of the first staying place based on the position data.

6. The system according to claim 3, wherein the computer program code further includes calculation code configured to cause the at least one processor to restrict use, in estimation of the staying time period, of a staying time period having a low probability of becoming one of a destination and a via point, wherein low probability corresponds to a corresponding destination or via point not corresponding to a past delivery destination.

7. The system according to claim 1,
wherein the feature information indicates an attribute of one of a region and a building.

8. The system according to claim 1,
wherein the feature information indicates one of a time slot and a time of staying at the via point.

9. The system according to claim 1,
wherein the feature information indicates a weather condition at the via point.

10. The system according to claim 1, wherein the staying time period code is further configured to estimate the staying time period based on the position of the via point and on an attribute of the mobile object.

11. The system according to claim 1, wherein the computer program code further includes notification code configured to cause the at least one processor to notify a user, before the mobile object arrives at the destination and wherein the user is associated with the destination, of the arrival time.

12. The system according to claim 1,
wherein the mobile object includes one of a delivery person and a machine for delivering a package to each of a plurality of delivery destinations in order,
wherein the plurality of delivery destinations includes the destination,
wherein the plurality of delivery destinations includes the via point, and
wherein the via point includes a first delivery destination earlier in a delivery order than a second delivery destination, wherein the second delivery destination corresponds to the destination.

13. A method for accurate guidance of a route for a mobile object, the method comprising:
acquiring a position of a via point, wherein the via point is a location of a planned interim stay on a route to a destination, wherein the route is a path followed by a mobile object when the mobile object moves toward the destination;
obtaining a history of position data accumulated from at least one user terminal by referring to a database, the database configured to store the history of position data of the at least one user terminal, the position data indicating a relationship between a position of the at least one user terminal and a time;
training and adjusting a machine learning model based on training data including feature information and staying times for each of a plurality of staying places, each of the plurality of staying places corresponding to a past destination in the history of position data of the at least one user terminal, the machine learning model being thereby trained, based on the position data, to describe a relationship between feature information of an input staying place and a staying time of the input staying place;
estimating a staying time period for the via point, wherein the staying time period represents an estimate of a time that the mobile object will stay at the position of the via point, wherein the staying time period is estimated at least in part by inputting feature information on the via point to the machine learning model and acquiring the staying time outputted from the machine learning model;
estimating, in real time, an arrival time of the mobile object at the destination, wherein the mobile object is currently in motion and the real-time estimate of the arrival time is based at least in part on the staying time period;
adjusting the route based at least in part on the real-time estimate of the arrival time; and
transmitting the adjusted route to a device associated with the mobile object to be displayed on a display of the device,
wherein the staying time period for the via point is estimated a plurality of times prior to completion of the route, at least a first estimate of the staying time period being based on the history of position data before receipt of an additional position data point from the at least one user terminal, at least a second estimate of the staying time period being based on the history of position data after receipt of the additional position data point from the at least one user terminal.

14. A non-transitory information storage medium having stored thereon a program for causing a computer to accurately guide a route for a mobile object by:
acquiring a position of a via point, wherein the via point is a location of a planned interim stay on a route to a destination, wherein the route is a path followed by a mobile object when the mobile object moves toward the destination;
training and adjusting a machine learning model based on training data including feature information and staying times for each of a plurality of staying places, each of the plurality of staying places corresponding to a past destination in a history of position data of at least one user terminal, the position data indicating a relationship between a position of the at least one user terminal and a time, the position data having been accumulated from the at least one user terminal for storage in a database, the machine learning model being thereby trained, based on the position data, to describe a relationship between feature information of an input staying place and a staying time of the input staying place;
estimating a staying time period for the via point, wherein the staying time period represents an estimate of a time that the mobile object will stay at the position of the via point, wherein the staying time period is estimated at least in part by inputting feature information on the via point to the machine learning model and acquiring the staying time outputted from the machine learning model;

estimating, in real time, an arrival time of the mobile object at the destination, wherein the mobile object is currently in motion and the real-time estimate of the arrival time is based at least in part on the staying time period;

adjusting the route based at least in part on the real-time estimate of the arrival time; and transmitting the adjusted route to a device associated with the mobile object to be displayed on a display of the device, wherein the staying time period for the via point is estimated a plurality of times prior to completion of the route, at least a first estimate of the staying time period being based on the history of position data before receipt of an additional position data point from the at least one user terminal, at least a second estimate of the staying time period being based on the history of position data after receipt of the additional position data point from the at least one user terminal.

* * * * *